(12) United States Patent
Dietl

(10) Patent No.: US 11,228,733 B2
(45) Date of Patent: Jan. 18, 2022

(54) SURVEILLANCE SYSTEM AND ASSOCIATED METHODS OF USE

(71) Applicant: CYCLOPS TECHNOLOGY GROUP, LLC, Warren, OH (US)

(72) Inventor: Robert Sebastian Dietl, Warren, OH (US)

(73) Assignee: CYCLOPS TECHNOLOGY GROUP, LLC, Warren, OH (US)

( * ) Notice: Subject to any disclaimer, the term of this patent is extended or adjusted under 35 U.S.C. 154(b) by 202 days.

(21) Appl. No.: 13/939,438

(22) Filed: Jul. 11, 2013

(65) Prior Publication Data

US 2014/0015981 A1 Jan. 16, 2014

Related U.S. Application Data

(60) Provisional application No. 61/670,425, filed on Jul. 11, 2012.

(51) Int. Cl.
  *H04N 7/18* (2006.01)
  *H04N 5/225* (2006.01)
  (Continued)

(52) U.S. Cl.
  CPC ......... *H04N 7/18* (2013.01); *G08B 13/19619* (2013.01); *G08B 13/19632* (2013.01);
  (Continued)

(58) Field of Classification Search
  CPC . H04N 5/2252; H04N 7/183; G08B 13/19619
  See application file for complete search history.

(56) References Cited

U.S. PATENT DOCUMENTS 4,225,881 A 9/1980 Tovi
4,945,367 A 7/1990 Blackshear
(Continued)

FOREIGN PATENT DOCUMENTS

KR 10-2008-0043459 A 5/2008
KR 10-2010-0109125 A 10/2010
(Continued)

OTHER PUBLICATIONS

EESR for EP 13817293.7, dated Apr. 6, 2016.
International Search Report for PCT/US2013/050138, dated Oct. 16, 2013.

*Primary Examiner* — Zhubing Ren
(74) *Attorney, Agent, or Firm* — Bryan D. Zerhusen; Nicholas R. Herrel; Cantor Colburn LLP

(57) ABSTRACT

A remote observation or surveillance device for simultaneous 360 degree imaging comprising a housing defining an internal chamber wherein each side wall includes a viewing window, a means for mounting having a slot, configuration of slots, track or combination thereof, a plurality of camera mounting brackets slidably and/or adjustably affixed to the mounting means through the slot or track, each bracket being adjustably affixed to a camera, wherein the cameras are configured to provide simultaneous 360 degree live or recorded imaging. The cameras can be configured to provide any combination of viewing angles and degrees of magnification or zoom. The device may also comprise a processor or server in operable communication with the cameras, which is configured to control the cameras and/or store and archive video, imaging, and/or audio data.

20 Claims, 17 Drawing Sheets

(51) Int. Cl.
 *G08B 13/196* (2006.01)
 *H04N 5/247* (2006.01)
 *H04N 5/232* (2006.01)

(52) U.S. Cl.
 CPC ......... *H04N 5/2251* (2013.01); *H04N 5/2252* (2013.01); *H04N 5/247* (2013.01); *H04N 5/23206* (2013.01); *H04N 7/181* (2013.01)

(56) References Cited

U.S. PATENT DOCUMENTS

| | | |
|---|---|---|
| 5,128,755 A | 7/1992 | Fancher |
| 5,604,509 A | 2/1997 | Moore |
| 5,886,738 A | 3/1999 | Hollenbeck |
| 6,019,524 A * | 2/2000 | Arbuckle ............... F16M 11/10 248/346.06 |
| 6,333,759 B1 | 12/2001 | Mazzilli |
| 6,636,256 B1 | 10/2003 | Passman |
| 6,675,934 B1 | 1/2004 | McCormick |
| 6,690,411 B2 | 2/2004 | Naidoo |
| 6,698,021 B1 | 2/2004 | Amini |
| 6,738,073 B2 | 5/2004 | Park |
| 6,924,838 B1 | 8/2005 | Nieves |
| 7,023,913 B1 | 4/2006 | Monroe |
| 7,051,356 B2 | 5/2006 | Weinstein |
| 7,335,026 B2 | 2/2008 | Goree |
| 7,428,000 B2 | 9/2008 | Cutler |
| 7,460,148 B1 | 12/2008 | Clark |
| 7,710,452 B1 | 5/2010 | Lindberg |
| 7,894,531 B1 | 2/2011 | Cetin |
| 7,933,556 B2 | 4/2011 | Tischler |
| 7,940,299 B2 | 5/2011 | Geng |
| 2001/0033329 A1 | 10/2001 | Zhang |
| 2002/0175995 A1 | 11/2002 | Sleeckx |
| 2004/0066451 A1 | 4/2004 | Schroth |
| 2004/0179093 A1 | 9/2004 | Inan |
| 2005/0151846 A1* | 7/2005 | Thornhill ...................... 348/149 |
| 2005/0273831 A1 | 12/2005 | Slomovich |
| 2006/0001741 A1 | 1/2006 | Hsu |
| 2006/0044406 A1 | 3/2006 | Swarr |
| 2006/0070107 A1 | 3/2006 | Renkis |
| 2007/0097212 A1 | 5/2007 | Farneman |
| 2007/0291115 A1 | 12/2007 | Bachelder |
| 2008/0068458 A1 | 3/2008 | Carroll |
| 2008/0158336 A1 | 7/2008 | Benson |
| 2009/0007170 A1 | 1/2009 | Everitt |
| 2009/0119730 A1 | 5/2009 | Perlman |
| 2009/0192990 A1 | 7/2009 | Chin |
| 2009/0195655 A1 | 8/2009 | Pandey |
| 2009/0244279 A1 | 10/2009 | Walsh |
| 2010/0033573 A1 | 2/2010 | Malinovski |
| 2010/0033577 A1 | 2/2010 | Doak |
| 2010/0067894 A1* | 3/2010 | Arbuckle et al. ............. 396/419 |
| 2010/0104274 A1* | 4/2010 | Rowen .................. G03B 17/00 396/425 |
| 2010/0141760 A1 | 6/2010 | Cheng |
| 2010/0208068 A1 | 8/2010 | Elsemore |
| 2010/0271479 A1 | 10/2010 | Heydlauf |
| 2010/0321463 A1 | 12/2010 | Weinstein |
| 2011/0134241 A1 | 6/2011 | Weissman |
| 2011/0181716 A1 | 7/2011 | McLeod |
| 2011/0242317 A1 | 10/2011 | Wengrovitz |
| 2011/0242322 A1 | 10/2011 | O'Connell |
| 2011/0249100 A1 | 10/2011 | Jayaram |
| 2011/0267462 A1 | 11/2011 | Cheng |
| 2012/0163789 A1* | 6/2012 | Masuno ................ G02B 27/144 396/325 |
| 2012/0169842 A1 | 7/2012 | Chuang |

FOREIGN PATENT DOCUMENTS

| | | |
|---|---|---|
| KR | 10-2010-0111789 A | 10/2010 |
| WO | WO 2006/074328 A2 | 7/2006 |

\* cited by examiner

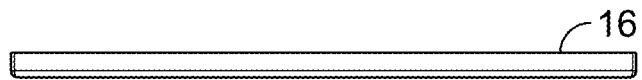
FIG. 7A
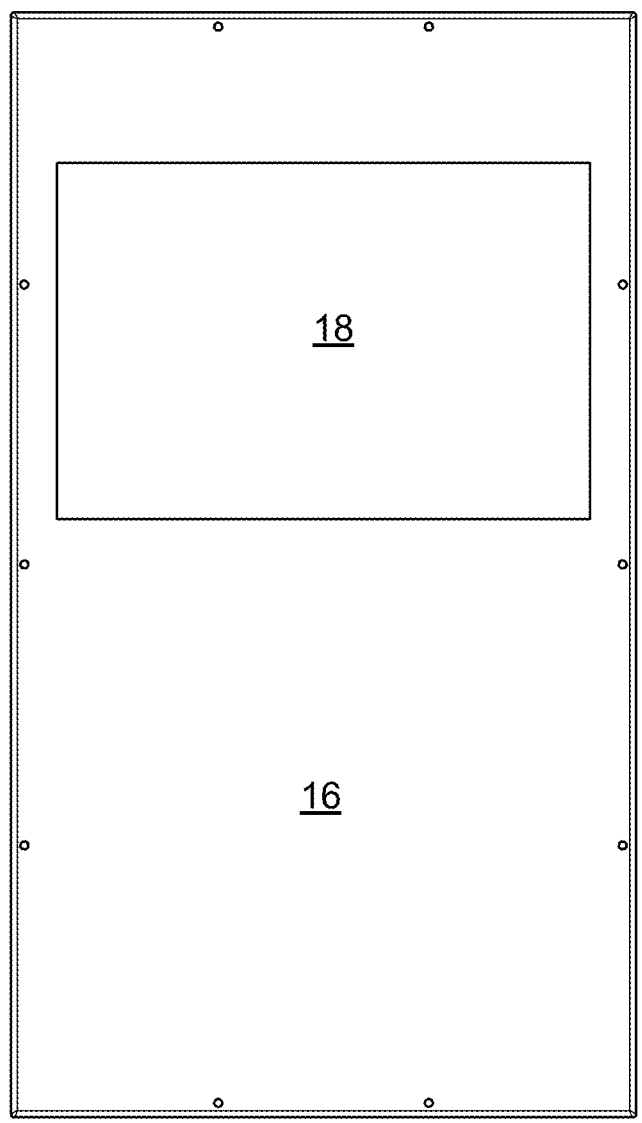 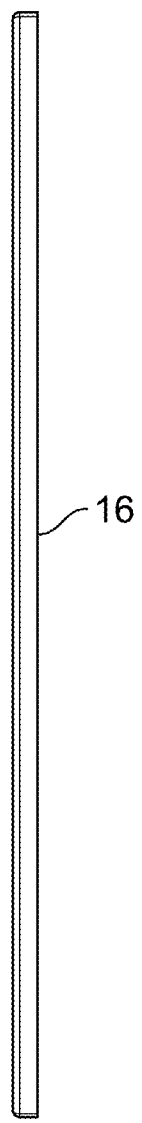
FIG. 7B  FIG. 7C

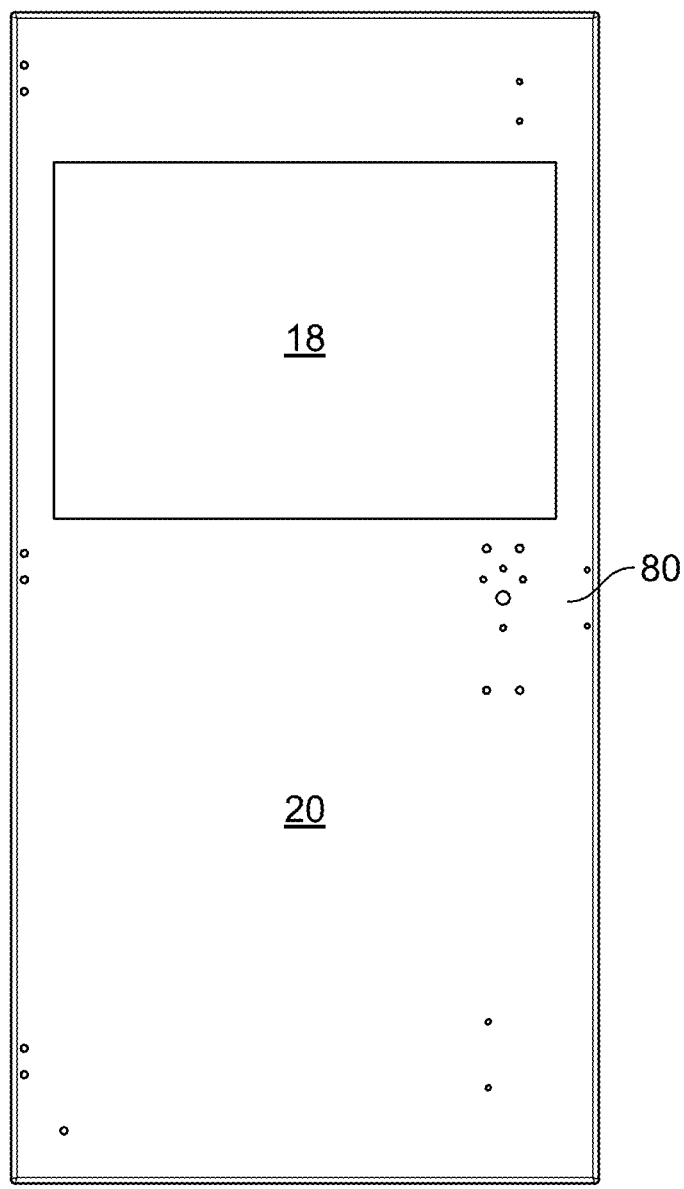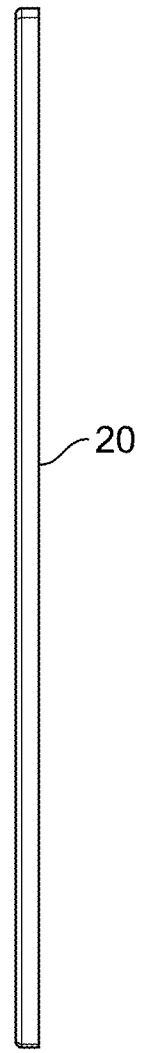

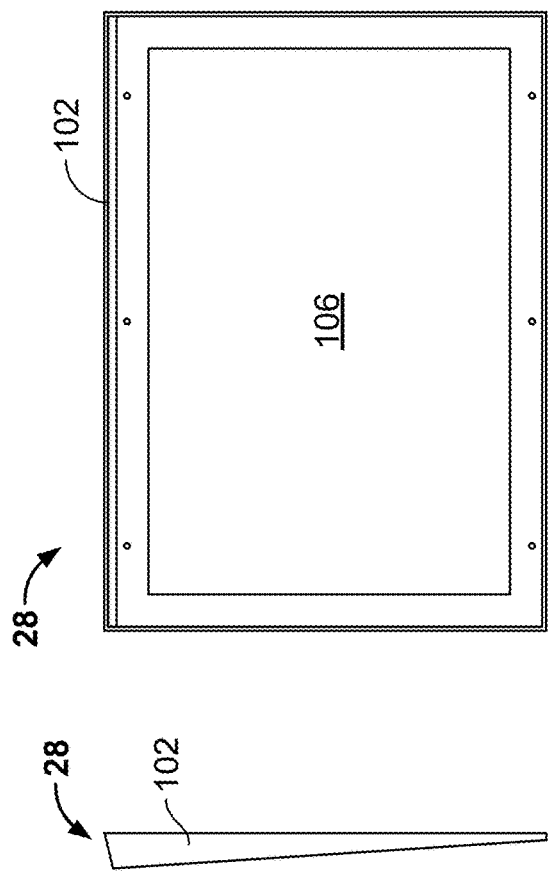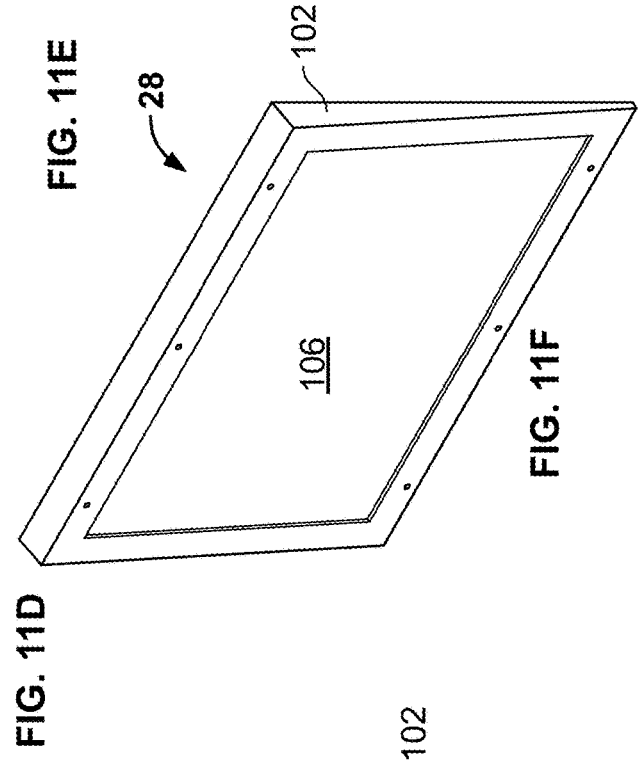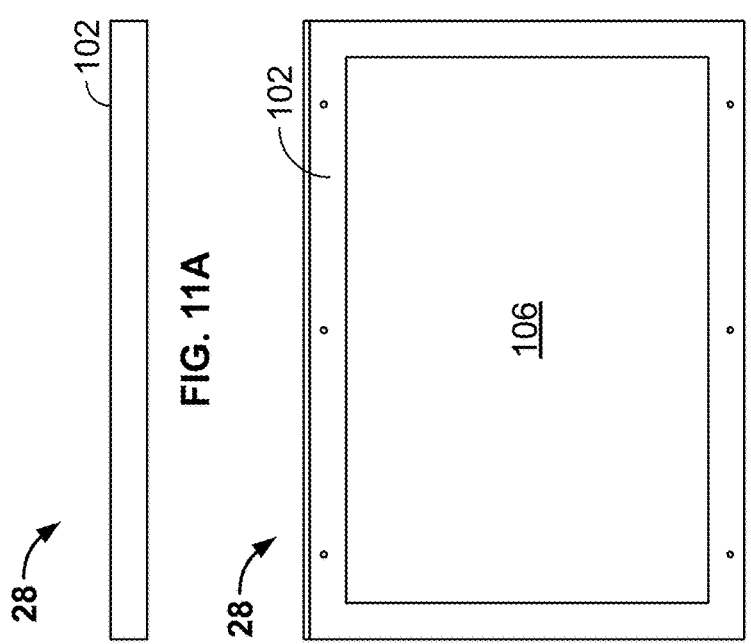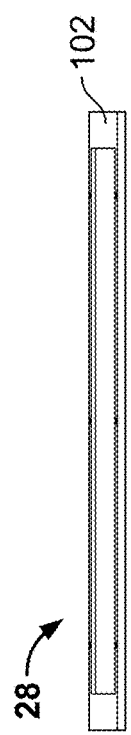
FIG. 11A
FIG. 11B
FIG. 11C
FIG. 11D
FIG. 11E
FIG. 11F

SURVEILLANCE SYSTEM AND ASSOCIATED METHODS OF USE

CROSS REFERENCE TO RELATED APPLICATIONS

This application claims the benefit under 35 U.S.C. § 119(e) of U.S. Provisional Patent Application 61/670,425 filed Jul. 11, 2012, which is incorporated herein by reference in its entirety.

FIELD OF THE INVENTION

This application relates to video surveillance systems and in particular to self-contained surveillance systems having a camera array configured to allow 360° live remote monitoring, and video archiving features.

BACKGROUND

The use of video surveillance as a means for monitoring property, improving security, deterring crime, and providing evidence continues to expand in both public and private settings. For example, with budgetary issues plaguing municipalities and companies in the private sector alike, the implementation of video surveillance is especially attractive as an economical alternative that provides for enhanced security at a fraction of the cost of hiring security personnel. In addition, video surveillance systems provide the user with flexibility should the conditions or area to be monitored change over time.

However, conventional video surveillance systems suffer from a number of shortcomings. For example, in many instances conventional video surveillance systems require the installation of many individual cameras in various positions just to survey or monitor an area of interest. Of course, the installation of multiple cameras is associated with increased upfront costs, as well as additional maintenance and monitoring costs. Systems based on multiple single camera units can also require multiple devices for capturing and recording or saving the image data, further increasing the costs. Even in situations where the camera automatically pans or tilts, single camera systems inevitably leave certain areas unmonitored for periods of time, which can undermine their effectiveness in the first instance. Single camera systems also frequently lack the ability to monitor the same area using multiple types of imaging platforms, e.g., analog, digital, infrared, or thermal imaging, and/or the lack the ability to monitor the same area using varying degrees of zoom.

Currently available devices that include or house multiple cameras similarly suffer from a number of well-known limitations. For example, many multi-camera devices are limited in the number of cameras and/or camera types that can be utilized with the system. Also, existing surveillance devices typically do not provide for the ability to monitor a single field of view using multiple imaging platforms, unless additional surveillance units are installed to provide more complete coverage. Furthermore, typical multi-camera devices have a relatively limited number of potential camera configurations available, which also means that additional units or cameras must be placed in other areas to achieve complete coverage, further increasing deployment and monitoring costs. Significantly, the vast majority of multi-camera devices are designed to be mounted from a vertical wall or other surface by affixing a side wall of the device directly to the vertical surface. As such, these devices inherently lack the ability to survey 360 degrees. Also, because of their design, many multi-camera devices do not have sufficient capacity to store the video or image data and require direct cabling to monitoring equipment, which requires additional time and resources to deploy.

As such, there exists an ongoing need in the art for video or imaging surveillance devices that address and/or overcome one or more of the above shortfalls. For example, it would be highly desirable to obtain and deploy a single device capable of monitoring a 360 degree area simultaneously using one or more imaging types, angles, and degrees of magnification. It would also be desirable to have a device that had the capacity to store and/or transmit wirelessly the video or imaging data to a remote user. Further still, it is desirable to have a device that offers significant flexibility in the number and configuration of cameras such that the same device could be deployed in a variety of settings while retaining its ability to provide 360 degree surveillance coverage.

SUMMARY

The present description provides a self-contained video surveillance device and related system having a video and/or imaging camera array configured to allow approximately 360 degree live remote monitoring and video and imaging archiving. The devices and systems as described herein provide increased coverage as compared to other video surveillance applications, provide ample video or image storage capacity, allow for diversity and flexibility in the types of imaging and camera array configuration; provide for remote monitoring and control, and are integrated so that it is convenient to install and maintain.

Thus, in one aspect the description provides a device for approximately 360 degree surveillance imaging comprising a housing defining an internal chamber and including a viewing window on each side wall, wherein the internal chamber of the housing comprises, (a) a means for mounting, wherein the means includes a slot, configuration of slots, track or combination thereof; (b) a plurality of camera mounting brackets comprising one end having a camera mount configured to adjustably affix a camera, and another end configured to be slidably and/or adjustably affixed to the mounting platform through the slot or configuration of slots in the mounting platform; and (c) a camera adjustably affixed to each bracket camera mount, wherein the cameras are configured to provide for substantially 360 degree viewing or imaging simultaneously.

In any of the embodiments as taught or described herein, the housing may be of any desired size or shape, e.g., triangular, square or rectangular or cylindrical. In certain preferred embodiments, the housing is approximately rectangular in shape (i.e., a bottom surface, four side walls, and a top surface). In a preferred embodiment, the housing further comprises a door hingely connected a side wall, wherein the door has an open position and a closed position. In certain embodiments, the door further comprises a latch or a lock for securing the door closed.

In any of the embodiments as taught or described herein, the viewing window comprises an opening in a side wall. In a preferred embodiment, the viewing window has dimensions sufficient to provide for camera imaging in 360 degrees. In an additional embodiment, the viewing widow has a width that is approximately the same length as the side wall. In certain embodiments, e.g., wherein the housing is cylindrical, the side wall comprises a viewing window that extends in a horizontal plane approximately the entire circumference of the cylinder.

In certain embodiments, the viewing window also comprises a transparent pane covering the opening such that light, and therefore, video or image data can still be captured by the cameras but the internal components are substantially protected from the outside environment. In certain embodiments, the transparent pane is formed of a material such as glass or plastic, e.g., Plexiglas, polycarbonate, polyacrylic, polyvinyl, polystyrene or other durable polymeric material, aluminum oxynitride, spinel or a combination thereof. In additional embodiments, the transparent pane is tinted to reduce glare, is comprised of a non-glare transparent material, comprised of auto-tinting glass or a combination thereof. In certain additional embodiments, the transparent pane is affixed at an acute angle (relative to the vertical plane of the side wall) to facilitate downward camera angles.

In additional embodiments, the housing also comprises one or more light-impenetrable or opaque vertical partitions or curtains separating one side from the another thereby reducing or preventing the glare or light entering from one side of the housing from interfering with cameras on the other side of the partition within the housing.

In any of the embodiments as taught or described herein, means for mounting comprises one or more mounting platforms. The mounting platform includes a top surface and a bottom surface, and includes a slot or configuration of slots extending therethrough. The mounting platform may be of any desired shape. However, as would be recognized by the skilled artisan, the shape of the mounting platform will in most cases be dictated by the shape of the housing, itself, such that the mounting platform fits neatly within the internal chamber of the housing. In certain embodiments, the mounting platform is affixed within the housing in a substantially horizontal plane near the top of the housing, near the bottom of the housing. In a preferred embodiment, the side panels of the housing comprise slots extending horizontally along the inward facing surface of the side wall configured to receive the mounting platform and secure it in place.

In another embodiment, the means for mounting comprises a rail or plurality of rails forming a slot, configuration of slots or a track therebetween, wherein the rails are secured or affixed to the side walls of the housing. In another embodiment, the housing comprising a plurality of rails and further comprises a plurality of camera mounting brackets slidably and/or adjustably affixed to the rails. In another embodiment, the housing comprises both a mounting platform and a plurality of rails for slidably and/or adjustably affixing a plurality of camera mounting brackets.

In an additional embodiment, the housing comprises a cooling unit, e.g., a thermostat controlled climate conditioning unit, for maintaining a temperature within the internal chamber of the housing.

In certain embodiments, the housing comprises two mounting platforms, each affixed within the housing in a substantially horizontal plane, wherein the mounting platforms define three compartments within the internal chamber of the housing. Thus, in an additional embodiment, the device comprises a mounting platform affixed near the top of the viewing window, near the bottom of the viewing window or both, allowing for cameras to be mounted in a vertical plane from the top platform, the bottom platform or both with a camera angle that is aligned with the viewing window.

In any of the embodiments as taught or described herein, the mounting platform comprises a plurality of slots or configuration of slots having a length that allows the camera to be slid or moved along the axis of the mounting platform. In still additional embodiments, the slot or configuration of slots have a width sufficient to allow part of the camera mounting bracket to extend or pass through it but narrow enough such that part of the camera mounting bracket can rest on a surface of the mounting platform so as to secure and fix the position of the camera. In certain embodiments, the mounting platform comprises one or more geometrical configurations of slots that allows for a virtually unlimited number of possible camera positions. For example, in one embodiment, one or more slots are cut in a shape that is substantially the same as the shape of the mounting platform but having a reduced length and width (in the case of a rectangular or square shape) or diameter (in the case of a circular shape). In certain embodiments, the slots are concentric (i.e., share the same center or axis). In certain embodiments, the mounting platform comprises a configuration of slots having an "H" or "double-H" like shape (e.g., "|-|" or "|-|-|") or a combination of both. In another of the preferred embodiments, the mounting platform is secured within the housing at a height sufficient to align the viewing windows with the viewing angle of the cameras.

In any of the embodiments taught and described herein, the mounting platform may additionally comprise one or more holes or apertures in extending through from the top surface to the bottom surface to accommodate wiring or cables for the devices contained in the housing.

In any of the embodiments taught and described herein, the camera mounting bracket may be a single (i.e., unitary) or multi-component device so long as the bracket comprises one portion that can extend or be received through the slots in the mounting platform and be reversibly tightened and secured to the mounting platform surface in order to slide and fix, respectively the bracket; and a portion that is adjustably affixed to a camera. In certain embodiments, the camera mounting brackets are slidably and/or adjustably affixed to the mounting platform near the top of the internal chamber of the housing, near the bottom of the internal chamber of the housing or a combination of both.

In certain embodiments, the camera mounting bracket comprises a fastener having a body defining a head and a shaft, wherein the head is wider than the shaft and also the width of the slot or combination of slots in the mounting platform. In other words, the slots in the mounting platform have a width sufficient to retain the head of the fastener while allowing the shaft of the fastener to extend therethrough and engage the camera mounting bracket. In certain embodiments, the head of the fastener rests or sits directly or indirectly on a surface of the mounting platform.

In additional embodiments, the camera mounting bracket comprises a co-axial shaft, a portion of which extends through the slot in the mounting platform, and is received by fastener, i.e., a bolt or disc configured to slidably and/or adjustably affix the camera in a position along the slot in the mounting platform, wherein the fastener is configured to be reversibly loosened and tightened, and wherein when loosened, the camera mounting bracket can be slid along the length of the slot in the mounting platform, and when tightened the camera is secured into position.

In a preferred embodiment the camera mounting bracket is a post-type bracket comprising a wide or approximately flat portion configured to rest on a surface of the mounting platform, a reversibly securable fastener that extends through the slot in the mounting platform and is received by either or both of the flat portion and one end of the post, wherein the other end of the post comprises a camera mount. In a preferred embodiment, the camera mount comprises a ball-and-socket mount for adjustably affixing a camera.

In any of the embodiments taught and described herein, the device comprises a plurality of cameras, for example, an analog camera, a digital camera, an infrared camera, a heat imaging camera, a video camera, a still image camera, IP based camera or a combination thereof. In certain embodiments, the device comprises one or more pan/tilt/zoom cameras. In a preferred embodiment, the cameras are configured within the housing such that substantially 360 degrees of viewing or imaging data is captured (and recorded and/or transmitted) simultaneously.

In any of the embodiments taught and described herein, the device comprises a computer component, e.g., at least one computer processor or server operably connected to each of the cameras, directly or indirectly. In a preferred embodiment, the processor or server is configured to capture and/or store imaging data from the cameras. In any of the embodiments taught and described herein, the device further comprises a local area network (LAN) connection, a wireless local area network (WLAN) or wi-fi internet transmitter or combination thereof.

In any of the embodiments taught and described herein, the device comprises a power source. In certain embodiments, the power source is configured to receive an AC electrical connection, a DC electrical connection, e.g., a battery or battery pack, and/or solar electric. In an embodiment, the device comprises one or more solar electric panels affixed to one or more surfaces of the device for providing power and/or charging a battery.

In an additional aspect, the description provides an integrated 360 degree surveillance system comprising a device as described herein, a computer processor or server, a data connection, i.e., fiber, Cat5, Cat6, or the like, to transmit data and/or information to the user, and a remote receiver, processor and display that are in computer communication, e.g., wireless computer communication, with the device, wherein the cameras capture video or images simultaneously from substantially 360 degrees of view, and wherein the processor or server stores the video or image data, and wherein the internet transmitter transmits the video or image data information to a remote processor and/or display.

In still an additional aspect, the description provides a method of surveying or monitoring simultaneously and in real-time a substantially 360 degree area comprising the steps of providing a surveillance device as described herein and a remote display, wherein the device and the remote display are in computer communication, supplying power to the same, and monitoring remotely substantially 360 degrees of viewing area simultaneously.

The preceding general areas of utility are given by way of example only and are not intended to be limiting on the scope of the present disclosure and appended claims. Additional objects and advantages associated with the compositions, methods, and processes of the present invention will be appreciated by one of ordinary skill in the art in light of the instant claims, description, and examples. For example, the various aspects and embodiments of the invention may be utilized in numerous combinations, all of which are expressly contemplated by the present description. These additional advantages objects and embodiments are expressly included within the scope of the present invention. The publications and other materials used herein to illuminate the background of the invention, and in particular cases, to provide additional details respecting the practice, are incorporated by reference, and for convenience are listed in the appended bibliography.

BRIEF DESCRIPTION OF THE DRAWINGS

The accompanying drawings, which are incorporated into and form a part of the specification, illustrate example systems, components, and so on, that illustrate various example embodiments of aspects of the invention and, together with the description, serve to explain the principles of the invention. The drawings are only for the purpose of illustrating an embodiment of the invention and are not to be construed as limiting the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. Furthermore, elements may not be drawn to scale. Further objects, features and advantages of the invention will become apparent from the following detailed description taken in conjunction with the accompanying figures showing illustrative embodiments of the invention, in which:

FIG. 7 illustrates (A) a top view, (B) front, and (C) side view of the side wall of the exemplary video surveillance device housing of FIG. 1.

FIG. 8 illustrates (A) top view, (B) front, and (C) side view of the door panel of the exemplary video surveillance device housing of FIG. 1, including apertures for securing a latch or locking mechanism.

FIG. 11 illustrates (A) a top, (B) front, (C) bottom, (D) side, (e) back, and (F) top perspective view of the exemplary window assembly of FIG. 10.

DETAILED DESCRIPTION

Figure 1:
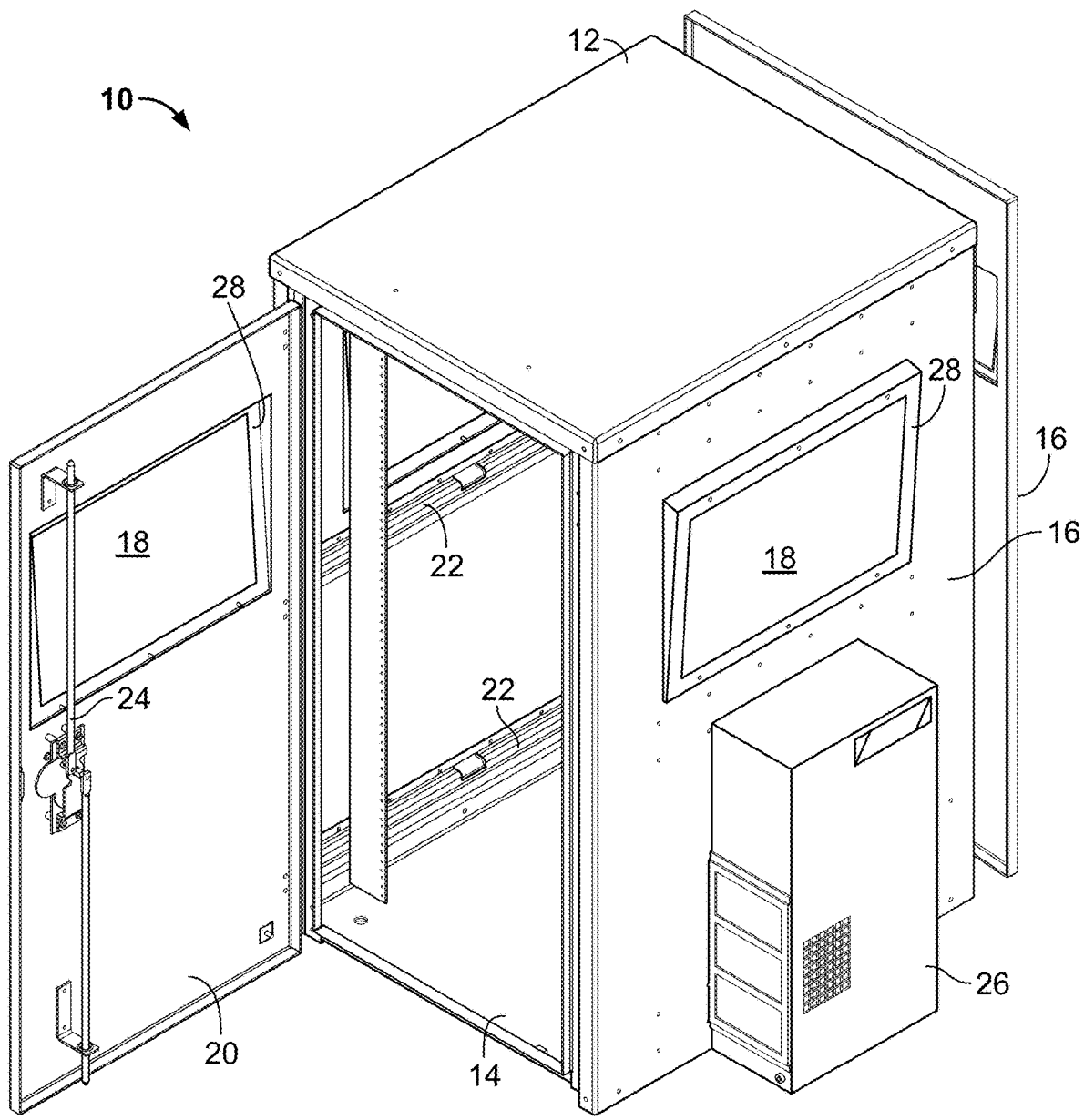
FIG. 1 illustrates a top perspective view of an exemplary video surveillance device housing as described herein.

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

The exemplary embodiments disclosed herein are illustrative of advantageous devices compositions, and systems of the present disclosure and methods/techniques thereof. It should be understood, however, that the disclosed embodiments are merely exemplary of the present disclosure, which may be embodied in various forms. Therefore, details disclosed herein with reference to exemplary steel compositions/fabrication methods and associated processes/techniques of assembly and use are not to be interpreted as limiting, but merely as the basis for teaching one skilled in the art how to make and use the advantageous steel compositions of the present disclosure. Drawing figures are not necessarily to scale and in certain views, parts may have been exaggerated for purposes of clarity.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. Ranges from any lower limit to any upper limit are contemplated. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Although any methods and materials similar or equivalent to those described herein can also be used in the practice or testing of the present invention, the preferred methods and materials are now described. All publications mentioned herein are incorporated herein by reference to disclose and described the methods and/or materials in connection with which the publications are cited.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

All numerical values within the detailed description and the claims herein are modified by "about" or "approximately" the indicated value, and take into account experimental error and variations that would be expected by a person having ordinary skill in the art.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention. The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Furthermore, to the extent that the term "or" is employed in the detailed description or claims (e.g., A or B) it is intended to mean "A or B or both". For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as, e.g., "only one of A or B" or "exactly one of A or B," "only A or B but not both," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." See, Bryan A. Garner, A Dictionary of Modern Legal Usage 624 (2d. Ed. 1995).

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," "includes," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein, the following terms may have meanings ascribed to them below, unless specified otherwise. However, it should be understood that other meanings that are known or understood by those having ordinary skill in the art are also possible, and within the scope of the present invention. In instances where a term is not specifically defined herein, that term is given an art-recognized meaning by those of ordinary skill applying that term in context to its use in describing the present invention. All publications, patent applications, patents, and other references mentioned herein are incorporated by reference in their entirety. In the case of conflict, the present specification, including definitions, will control. In addition, the materials, methods, and examples are illustrative only and not intended to be limiting. The examples are not intended to be limiting. Both singular and plural forms of terms may be within the definitions.

As used in this application, the term "computer component" refers to a computer-related entity: hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process or thread of execution and a computer component can be localized on one computer or distributed between two or more computers.

"Computer communication," as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium" or "CRM" as used herein, refers to a medium that participates in directly or indirectly providing signals, instructions, or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory, and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software, or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logics into one physical logic. Similarly, where a single logical logic is described, it may be possible to distribute that single logical logic between multiple physical logics.

"Query," as used herein, refers to a semantic construction that facilitates gathering and processing information. A query might be formulated in a database query language like structured query language (SQL) or object query language (OQL). A query might be implemented in computer code (e.g., C#, C++, Javascript) that can be employed to gather information from various data stores or information sources.

"Signal," as used herein, includes but is not limited to one or more electrical or optical signals, analog or digital signals, data, one or more computer or processor instructions, messages, a bit or bit stream, or other means that can be received, transmitted or detected.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, an operating system, a logic, software, or other entity. Logical or physical communication channels can be used to create an operable connection.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

The present description provides a video surveillance device and related system, and in particular a self-contained surveillance system having a video and/or imaging camera array configured to allow approximately 360 degree live remote monitoring and, e.g., video and imaging archiving. A single camera only gives one point of view at in a single focal zoom at any particular moment. In addition, video consists of large amounts of data per frame, multiplied by thousands of bits of information that cannot be efficiently transmitted via current available modes of data communication. The device and systems as described herein provide increased coverage as compared to other video surveillance applications, provide ample video or image storage capacity, allows for diversity and flexibility in the types of imaging and camera array configuration; provide for remote monitoring and control, and is integrated so that it is convenient to install and maintain.

Current applications do not provide all in one local data storage solutions at this capacity with this flexibility. With multiple views from multiple devices mounted in one unit designed for full 360 degrees of view, the end result is full coverage where there was previously a fraction of coverage. In addition, the present device is large enough to accommodate large capacity storage devices or servers (i.e., multi-terabyte) to locally store video for review or download purposes. This eliminates the need for bandwidth requirements that normally would prohibit sufficient local video storage, thus prohibit video storage of capacity and speed.

The following description of aspects and embodiments provided herein includes reference to the exemplary embodiments depicted in the drawings. It is to be understood that the drawings and embodiments described herein are exemplary only, and additional modifications and combinations would be obvious to those of skill in the art in view of the present description, and therefore, are expressly included within the scope of the disclosure. For convenience, like components are referred to using like numerals.

In one aspect the description provides a device surveillance imaging the device comprising a housing defining an internal chamber and including a viewing window a side wall, wherein the internal chamber of the housing comprises, (a) a means for mounting, wherein the mounting means includes a slot, configuration of slots, a track or combination thereof; (b) a plurality of camera mounting brackets comprising one end having a camera mount configured to adjustably affix a camera, and another end configured to be slidably and/or adjustably affixed to the mounting platform through the slot or configuration of slots in the mounting platform; and (c) a camera adjustably affixed to each bracket camera mount.

In one aspect the description provides a device for approximately 360 degree surveillance imaging the device comprising a housing defining an internal chamber and including a viewing window on each side wall, wherein the internal chamber of the housing comprises, (a) a means for mounting, wherein the mounting means includes a slot, configuration of slots, a track or combination thereof; (b) a plurality of camera mounting brackets comprising one end having a camera mount configured to adjustably affix a camera, and another end configured to be slidably and/or adjustably affixed to the mounting platform through the slot or configuration of slots in the mounting platform; and (c) a camera adjustably affixed to each bracket camera mount, wherein the cameras are configured to provide for substantially 360 degree viewing or imaging simultaneously.

Various views of exemplary video surveillance devices and systems encompassed by the present description are illustrated in FIGS. 1-17. With reference to FIGS. 1-5, an exemplary device comprises a housing 10. The housing 10 comprises a top surface 12, a bottom surface 14, and side walls 16 defining an internal chamber. The housing 10 includes a viewing window 18 on each side wall 16. In any of the embodiments as described herein, the housing may be of any desired size or shape. For example, the cross-sectional shape of the housing may be triangular, square, pentagonal, hexagonal, octagonal or any other combination of angles, cylindrical or oval shaped. In certain preferred embodiments, the housing is approximately square in shape (i.e., four side walls of approximately equal length), as depicted in FIG. 1.

In addition, in any of the embodiments described herein the housing 10 can be constructed out of any suitable material known to those of skill in the art, including, e.g., wood, metal (e.g., steel, copper, aluminum), plastic, polycarbonate, an alloy or the like. As such, in certain embodiments, the housing is constructed of a material selected from the group consisting of wood, metal (e.g., steel, copper, aluminum), plastic, polycarbonate, alloy and combinations thereof. In certain embodiments, the housing is constructed out of metal. In a preferred embodiment, the housing is aluminum. The parts of the housing can be fastened using any suitable fastener known in the art, including studs, screws, rivets or the like. Exemplary positions of the fasteners are depicted in the figures as small open circles along the periphery of the housing components.

Methods and techniques suitable for fabricating the metal housing, for example, the housing 10 are well known in the art and are incorporated herein. For example, the metal or aluminum panels can be cut from a sheet to the desired dimensions and fastened with common fasteners, e.g., metal screws, rivets, bolts, or the like.

FIG. 1 also illustrates a housing 10 further comprising a door 20 hingely connected to a side wall 16, wherein the door 20 has an open position and a closed position. The door 20 optionally comprises a latch or a lock 24 for securing the door 20 in the closed position. The door latch 24 or lock can be of any suitable type well-known by those of skill in the art. As such, in a preferred embodiment, the housing comprises a door hingely connected to a side wall; the door optionally including a latch or lock for securing the door in a closed or locked position.

Figure 2:
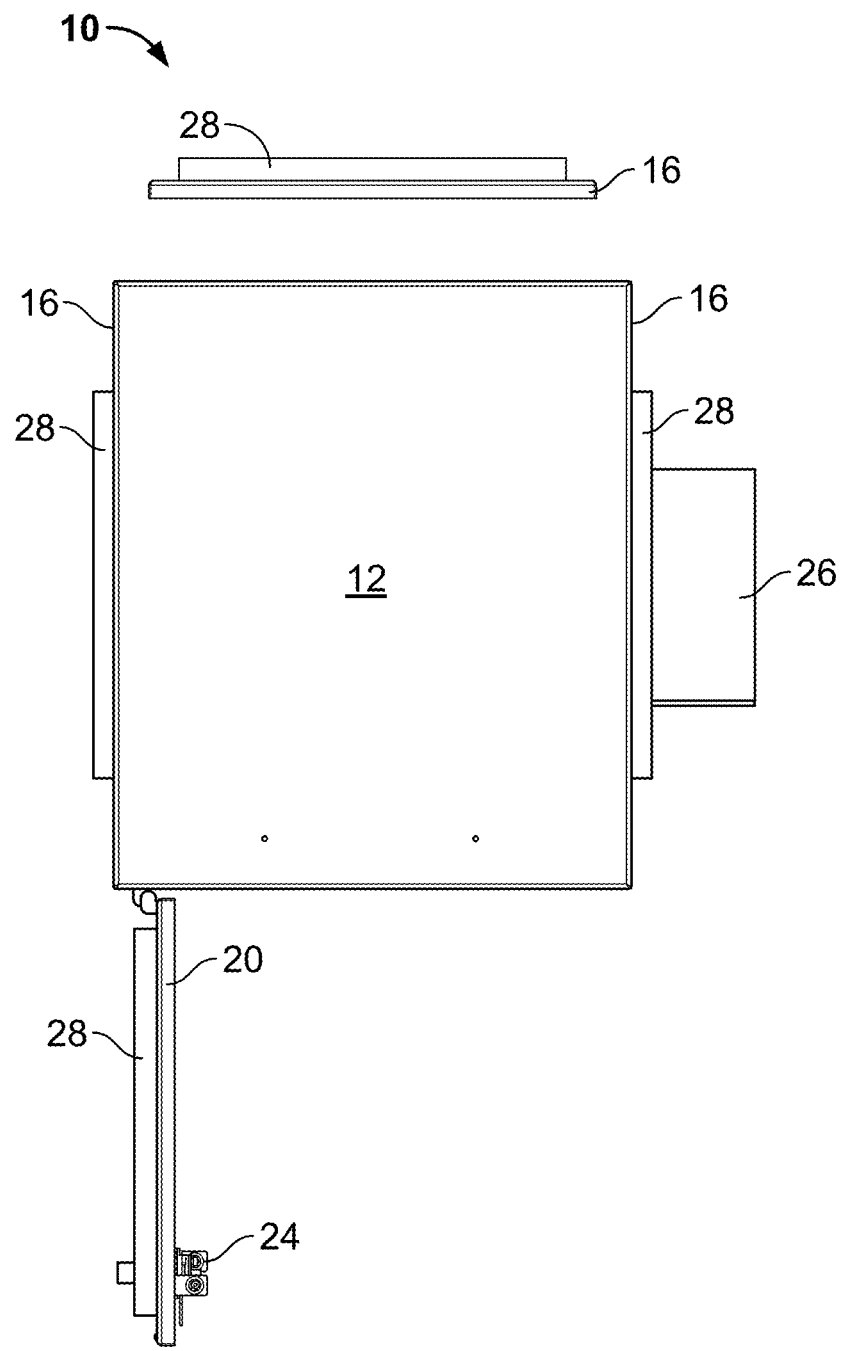
FIG. 2 illustrates a top view of the exemplary video surveillance device housing of FIG. 1.
Figure 3:
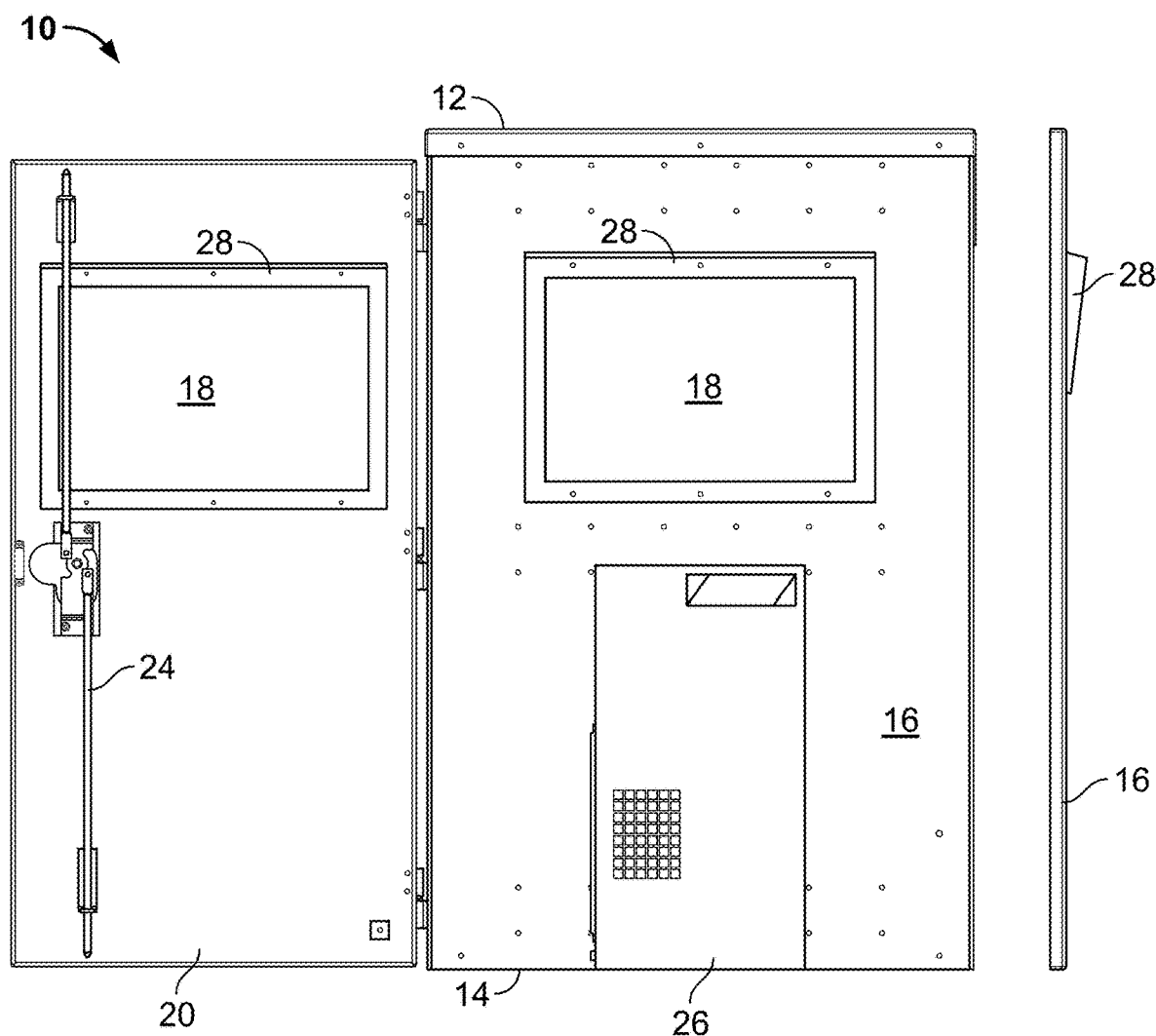
FIG. 3 illustrates a side view of the exemplary video surveillance device housing of FIG. 1.
Figure 4:
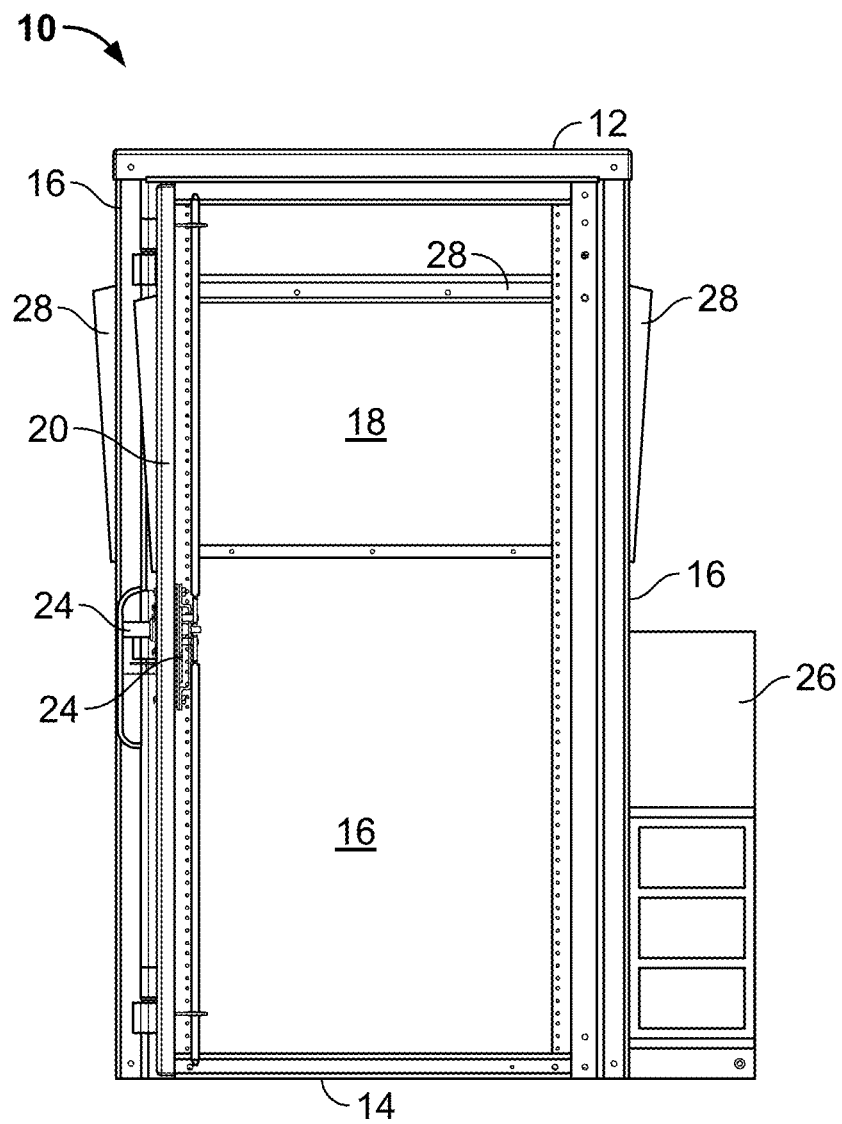
FIG. 4 illustrates a side view of the exemplary video surveillance device housing of FIG. 1; the view being into the through the open door into the interior of the housing.
Figure 5:
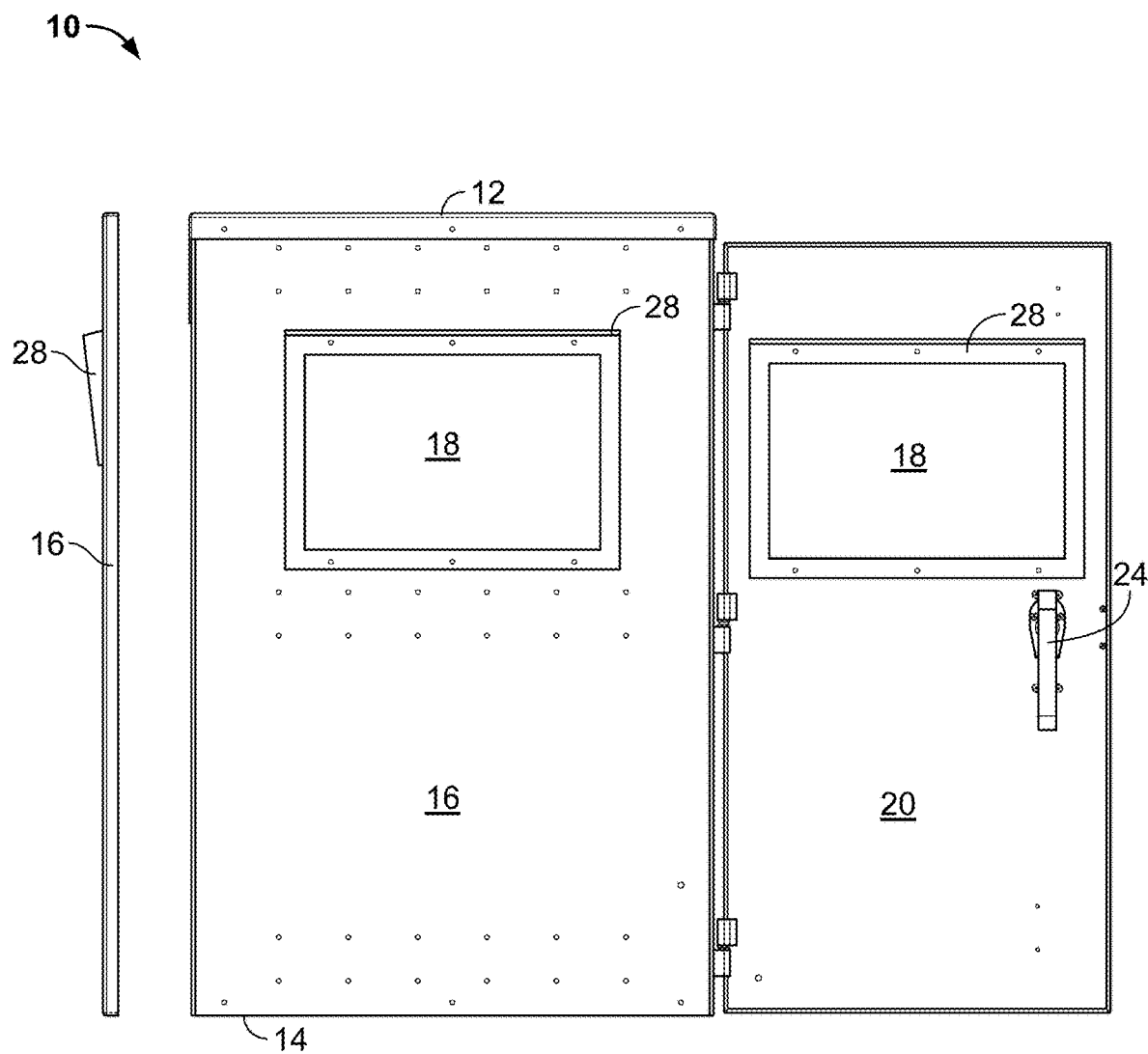
FIG. 5 illustrates a side view of the exemplary video surveillance device housing of FIG. 1.

FIG. 2 illustrates a top view of the exemplary housing 10 of FIG. 1. FIG. 3 illustrates a side view of the housing 10 of FIG. 1 showing the door 20 open (inside surface visible). FIG. 4 illustrates the front view of the exemplary housing 10 of FIG. 1 wherein the door 20 is open and the view is into the internal chamber. FIG. 5 illustrates another side view of the housing 10 of FIG. 1, wherein the back side wall is detached and the door 20 is open (front surface of door is visible).

Figure 6:
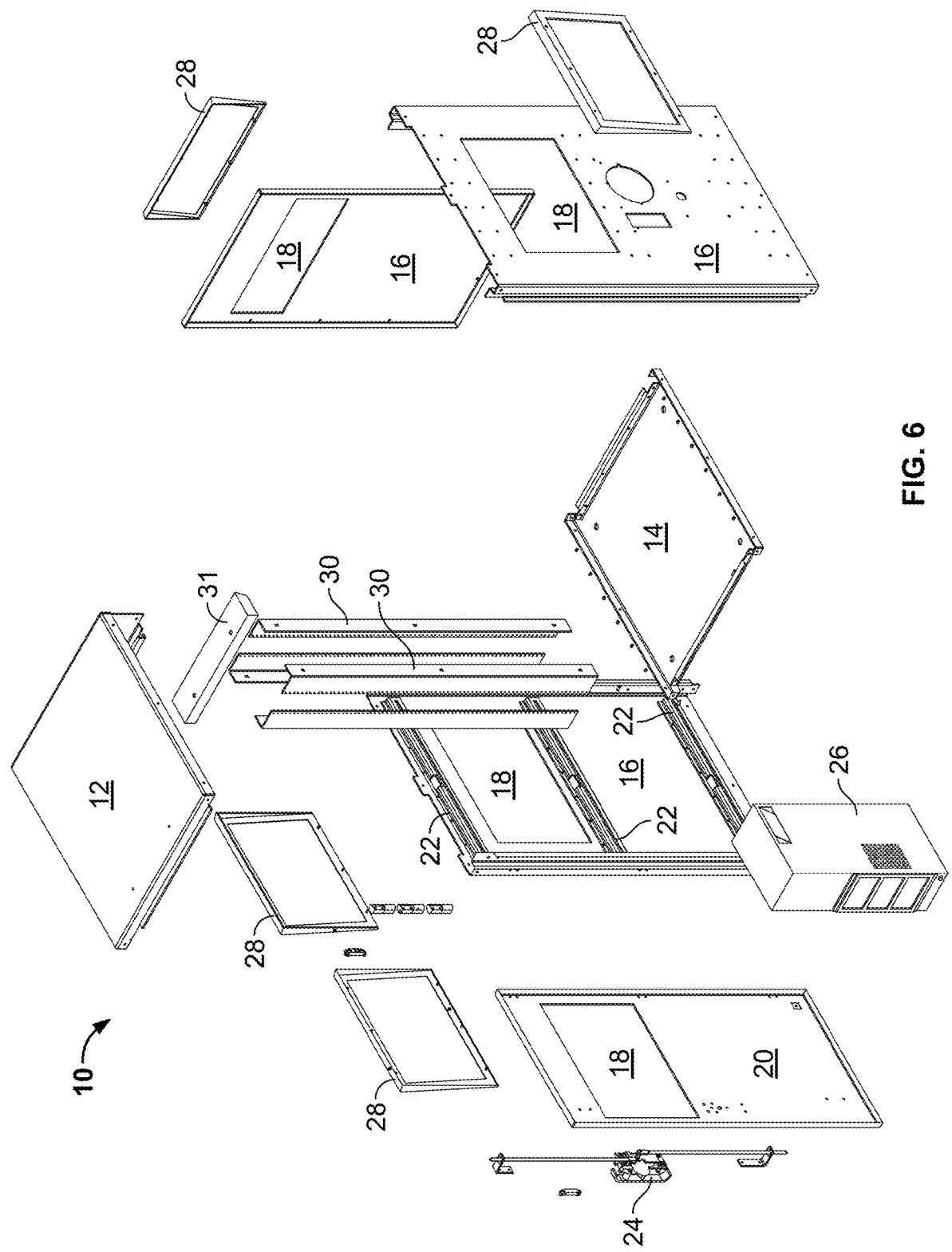
FIG. 6 illustrates an exploded view of the exemplary video surveillance device housing of FIG. 1.

FIG. 6 illustrates an exploded view of the housing 10 of FIG. 1. The drawing shows the top surface 12, the bottom surface 14, side walls 16, door 20, viewing window 18 and viewing window assembly 28, climate control unit 26. FIG. 6 also illustrates internal support frame studs 30 and an internal light bar 31. The small open circles represent exemplary positions for fasteners.

FIG. 7 provides multiple views ((A) top, (B) front, and (C) side) of a side wall 16 of the exemplary housing 10 of FIG. 1 comprising a viewing window 18 cut into the side wall.

FIG. 8 provides multiple views ((A) top, (B) front, and (C) side) of a door 20 of the exemplary housing 10 of FIG. 1 comprising a viewing window 18 cut into the side wall. FIG. 8 also shows exemplary apertures 80 extending through the door 20 for affixing the latch or lock 24.

Figure 9:
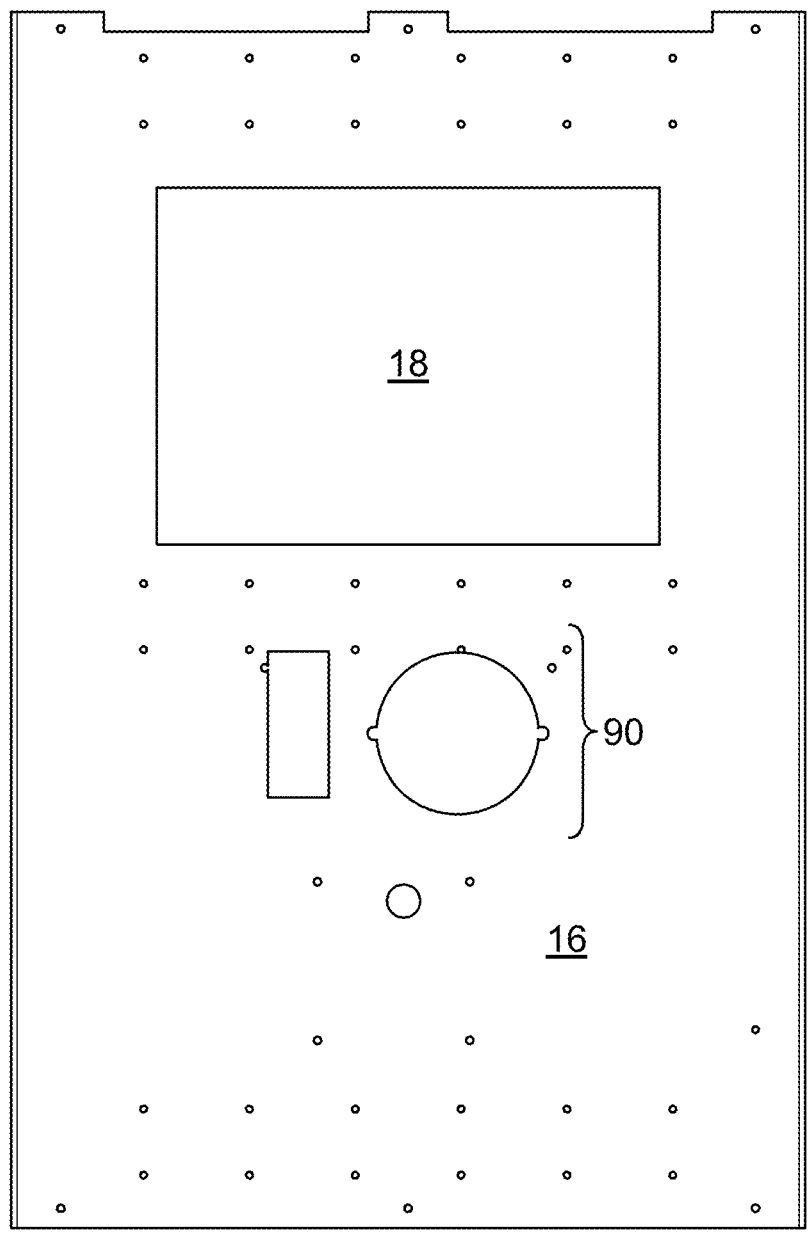
FIG. 9 illustrates a side view of a side wall of the exemplary video surveillance device housing of FIG. 1, which is configured to receive an climate control unit.

FIG. 9 provides a front view of another exemplary side wall 16 of the housing 10 from FIG. 1. The side wall 16 comprises a viewing window 18 cut into the side wall. FIG. 9 also shows exemplary apertures 90 extending through the side wall 16 for affixing a climate control unit 26.

As illustrated in exemplary device of FIGS. 1-5, the device as described herein preferably comprises a viewing window or opening 18 in the side wall(s) 16 and door 20 of the housing 10. Preferably, the size and location of the viewing window is aligned with the viewing angle of the cameras mounted in the housing 10.

The device or system as described herein is configured to view substantially 360 degrees, and therefore, the side wall or side walls comprise a viewing window or viewing windows that extend substantially the entire length of the side wall or side walls. It will be appreciated that design and fabrication needs might make it impractical or difficult to construct a viewing window that extends uninterrupted around the entire device. Accordingly, the description contemplates that some portion of the side wall will separate the viewing windows. As such, the description provides and the inventors expressly contemplate devices in which the viewing windows are of a sufficient size to allow substantially or approximately 360 degree imaging or viewing. In certain embodiments, the viewing windows are of a sufficient size to allow 360 degree viewing.

In any of the embodiments as taught or described herein, the viewing window comprises an opening in a side wall. In a preferred embodiment, the viewing window has dimensions sufficient to provide for camera imaging in substantially or approximately 360 degrees. In an additional embodiment, the viewing widow has a width that is approximately the same length as the side wall. In certain embodiments, e.g., wherein the housing is cylindrical, the side wall comprises a viewing window that extends in a horizontal plane approximately the entire circumference of the cylinder.

Figure 10:
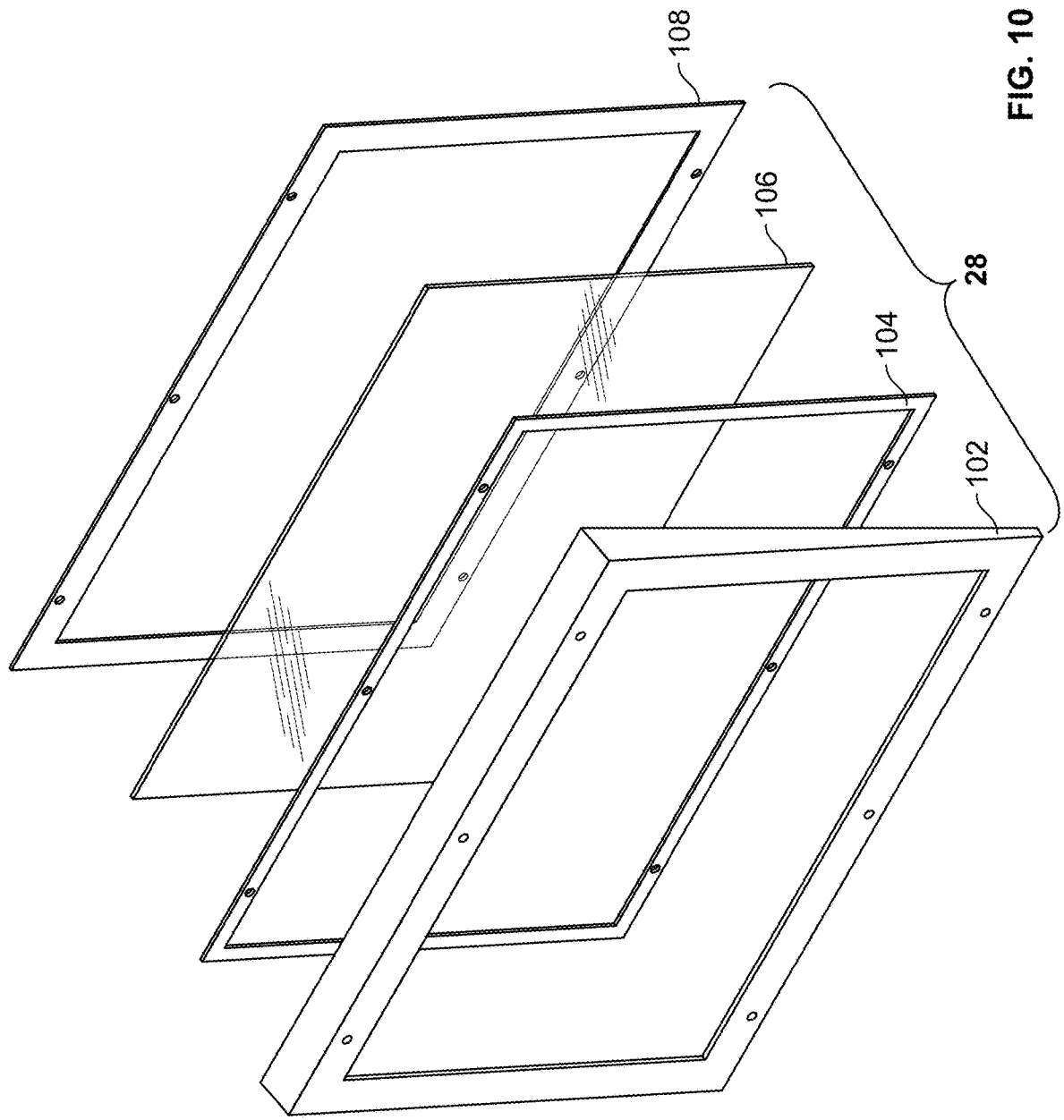
FIG. 10 illustrates an exploded view of an exemplary viewing window assembly of a video surveillance device housing as described herein.

In a preferred embodiment, the housing comprises a viewing window assembly 28 (see FIGS. 1-6, 10, 11, 14, and 15). With reference to FIG. 10, an exemplary viewing window assembly 28 comprises a main body 102 or frame, a set frame 104, a transparent pane 106, and a retaining bracket 108. The transparent pane 106 covering the viewing window 18 allows light to pass through, and therefore, video or image data can be captured by the cameras but the internal components are substantially protected from the outside environment. FIG. 11 illustrates a variety of views ((A) top, (B) front, (C) bottom, (D) side, (E) back, and (F) front perspective) of the viewing window assembly of FIG. 10.

In certain embodiments, the components of the viewing window assembly are connected using, e.g., rivets, suds, screws, glue, welds, or the like. In a preferred embodiment, the components of the viewing window assembly are secured together using studs, sealing washers and Nylock nuts. The viewing window assembly can also comprise weather stripping between one or more of the components of the assembly in order to further insulate the housing and prevent water leakage.

In certain embodiments, the housing comprises a transparent pane (e.g., 106, FIG. 10) formed of a durable transparent material such as glass or plastic, e.g., Plexiglas, polycarbonate (e.g., lexan), polyacrylic, polyvinyl, polystyrene or other durable polymeric material, aluminum oxynitride, spinel or a combination thereof. The ability of a glass withstand shock is improved by the process of tempering. When treated with heating and cooling or with chemical processes, the glass becomes much stronger. In a preferred embodiment, the transparent pane (e.g., 106) is lexan. In additional embodiments, the transparent pane (e.g., 106) is tinted to reduce glare, is comprised of a non-glare transparent material, comprised of auto-tinting glass or a combination thereof. In certain additional embodiments, the viewing window 18 is affixed at a downward angle (e.g., an obtuse angle relative to the vertical plane of the side wall) to facilitate downward camera angles.

Break-resistant panes, e.g., window panes, can also be constructed using, e.g., polycarbonate, thermoplastic, layers of laminated glass, or a combination thereof. The aim is to make a material with the appearance and clarity of standard glass but with effective protection from damage. Polycarbonate products, which can be used, are currently available, e.g., Armormax™, Makroclear™, Cyrolon™, Lexan™ or Tuffak™, which are often sandwiched between layers of regular glass. The polycarbonate usually has one of two types of coating to resist abrasion: a soft coating that heals after being scratched (such as elastomeric carbon-based polymers) or a hard coating that prevents scratching (such as silicon-based polymers). The plastic in laminate designs also provides resistance to impact.

The transparent panes can also be constructed of laminated glass built from glass sheets bonded together with polyvinyl butyral, polyurethane or ethylene-vinyl acetate. Alternatively, durable transparent panes can be constructed out of a transparent material including aluminum oxynitride "glass," e.g., ALON™ as the outside layer. ALON™ is much lighter and performs much better than traditional glass/polymer laminates.

The housing 10 also comprises a means for mounting comprising a slot, configuration of slots, a track or combination thereof. The means for mounting allows for almost unlimited flexibility in mounting devices, e.g., cameras, microphones, loud speakers, projectors, etc. In particular, the mounting means enables the cameras to be arrayed or configured to provide 360 degrees of simultaneous imaging. In certain preferred embodiments, the means is configured to receive a camera mounting bracket, wherein the means comprises a slot, configuration of slots or a track. It should be understood, however, that the means for mounting is not limited to merely receiving the camera mounting bracket. The slot, configuration or slots or track in the means for mounting could also be configured to receive the camera directly, such as, for example, in the case where the camera mount is permanently attached or an integral part of the camera itself. The means for mounting could also be used to mount any desired component including, e.g., a microphone, a loud speaker, a projector, and the like.

Figure 12:
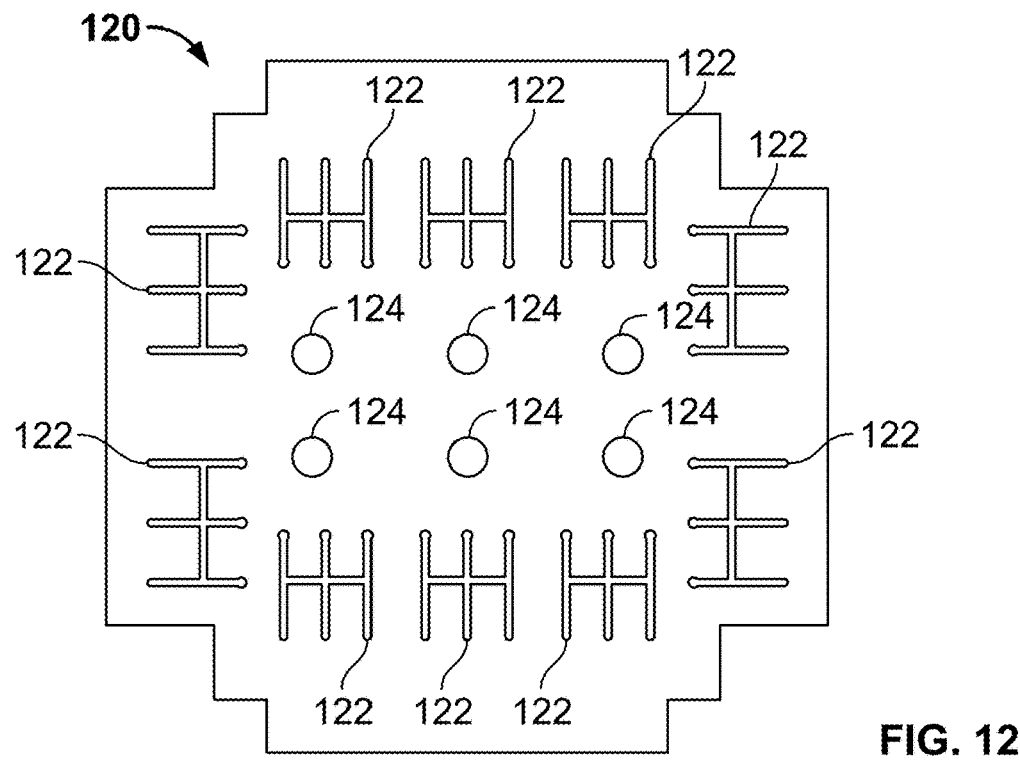
FIG. 12 illustrates a top view of an exemplary upper mounting platform of the video surveillance device housing as described herein.
Figure 13:
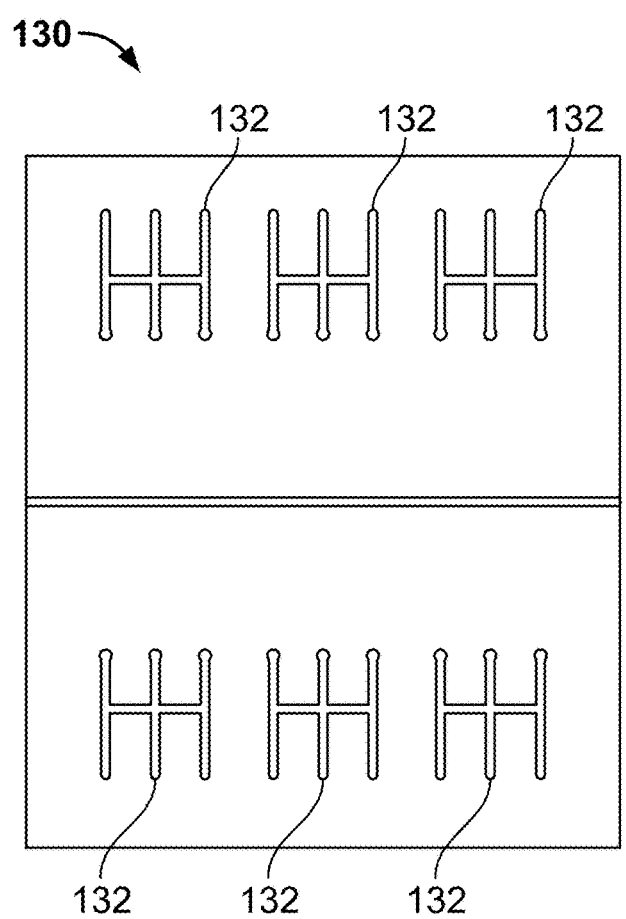
FIG. 13 illustrates a top view of an exemplary lower mounting platform of the video surveillance device housing as described herein.

In certain aspects, the means for mounting is a means for mounting a camera mounting bracket. In certain embodiments, the means for mounting a camera mounting bracket comprises a mounting platform having a slot or configuration of slots. Thus, in additional embodiments the internal chamber of the housing further comprises a mounting platform including a slot or configuration of slots. For example, FIGS. 12 and 13 illustrate an exemplary upper mounting platform 120 and a lower mounting platform 130 configured to fit within the internal chamber of, e.g., housing 10 (FIG. 1). In a preferred embodiment, the mounting platforms 120, 130 comprises a top surface and a bottom surface and at least one slot or configuration of slots 122, 132 extending therethrough. The slots or configuration of slots 122, 132 provide for universal camera mounting. In other words, the slots allow for an almost unlimited number and combination of camera positions.

It is contemplated that the mounting platform may be of any desired size and/or desired shape. However, as would be recognized by the skilled artisan, the shape of the mounting platform will in most cases be dictated by the shape of the housing, such that the mounting platform fits neatly within the internal chamber of the housing. In certain embodiments, the mounting platform, e.g., 120 and 130, is affixed within the housing in a substantially horizontal plane near the top of the viewing window, near the bottom of the viewing window or both. In any of the embodiments as taught or described herein, the device may comprise one or more mounting platforms.

In another exemplary embodiment, the side panels of the housing comprise brackets or tracks 22 (FIGS. 1, 4) extending horizontally along the inward facing surface of the side wall configured to receive the mounting platform and secure it in place. In additional exemplary embodiments, the housing comprises two mounting platforms, e.g., an upper mounting platform 120 and a lower mounting platform 130, each affixed within the housing in a substantially horizontal plane, wherein the mounting platforms define three compartments within the internal chamber of the housing.

Thus, in an additional embodiment, the housing comprises a mounting platform affixed near the top of the housing and a mounting platform affixed near the bottom of the housing, allowing for cameras to be mounted in a vertical plane from the top platform, the bottom platform or both. The above configuration is illustrated in the figures. As the figures show, an upper mounting platform 120 and lower mounting platform 130 comprising slots or a configuration of slots 122, 132. The figures also illustrate the viewing window 8 and viewing window assembly, which is angled downward. Significantly, the figures illustrate the camera mounting bracket 160 affixed to the mounting platform 120 and camera 162. The figures also illustrate how the camera mounting brackets can be of different lengths, which along with the slots, allows for a vast number of camera array combinations and viewing angles. Thus, in a preferred embodiment, the device comprises a plurality of camera mounting brackets of different lengths slidably and/or adjustably affixed to the mounting platform through the slots.

As indicated above, in a preferred embodiment the mounting platform comprises a plurality of slots or configuration of slots, see e.g., 122, 132, having a length that allows the camera mounting bracket (and therefore, the adjustably affixed camera) to be slid or moved along in a plane parallel to the mounting platform. Preferably, the slot or configuration of slots, (see, e.g., 122, 132) have a width sufficient to allow a fastener or a portion of a camera mounting bracket to extend or pass through the slot but narrow enough such that part of the fastener or camera mounting bracket can be secured and rest on the surface of the mounting platform near, juxtaposed or in apposition to the slot, so as to secure and fix the position of the camera. In certain embodiments, the mounting platform comprises one or more geometrical configurations of slots that allows for a virtually unlimited number of possible camera positions. For example, in one embodiment, one or more slots are cut in a shape that is substantially the same as the shape of the mounting platform but having a reduced length and width (in the case of a rectangular or square shape) or diameter (in the case of a circular shape). In certain embodiments, the slots are concentric (i.e., share the same center or axis). In certain embodiments, the mounting platform comprises a configuration of slots having an "H" or "double-H" like shape (e.g., "|-|" or "|-|-|") (see 122, 132, FIGS. 12 and 13) or a combination of both. In another of the preferred embodiments, the mounting platform 120, 130 is secured within the housing at a height sufficient to align the viewing windows with the viewing angle of the cameras.

In any of the embodiments taught and described herein, the mounting platform may additionally comprise one or more holes (see 124, FIG. 1) or apertures extending through from the top surface to the bottom surface to accommodate wiring or cables for the devices contained in the housing.

In certain embodiments, the means for mounting a camera mounting bracket comprises a rail or plurality of rails configured to form a slot, configuration of slots or track therebetween. Thus, in additional embodiments In another embodiment, the housing 10 comprises a plurality of rails or system of rails forming a slot, configuration of slots or a track therebetween, wherein the rails or system of rails are secured or affixed to the side walls of the housing, and wherein the rails are configured to secure a plurality of camera mounting brackets or other desired component as described herein, including, for example, a microphone, a loud speaker, a projector, a camera or the like. In certain embodiments, the rails are used instead of or in conjunction with the mounting platform. As such, the rails or system of rails can be installed near the top or the bottom of the viewing window. In certain embodiments, the rail comprises slots or a configuration of slots such that a single rail can be used to slidably and/or adjustably affix a camera mounting bracket. In another embodiment, the housing comprising a plurality of rails and further comprises a plurality of camera mounting brackets slidably and/or adjustably affixed to the rails. In another embodiment, the housing comprises both a mounting platform and a plurality of rails for slidably and/or adjustably affixing a plurality of camera mounting brackets.

In certain embodiments the description provides an enclosure for multiple surveillance cameras comprising: a plurality of side walls at 90 degrees from the top and bottom surfaces defining an internal chamber to accommodate a plurality of adjustably fixed cameras and/or a pan/tilt/zoom camera, and a mounting platform, wherein the cameras are slidably and/or adjustably affixed to slots in the mounting platform, and wherein the plurality of side walls include a viewing window that sufficient to allow approximately 360 degrees of viewing by the plurality of cameras.

In an additional aspect, the housing further comprises a plurality of camera mounting brackets. For example, the figures illustrate an exemplary embodiment of the device comprising a plurality of camera mounting brackets 160 affixed to the upper mounting platform 120, and a camera 162. In a preferred embodiment, the camera mounting brackets include an end having a camera mount configured to adjustably affix a camera, and another end configured to be slidably and/or adjustably affixed to the mounting platform through the slot or configuration of slots in the mounting platform.

In one embodiment, housing 10 includes a camera mounting bracket 160, which may mount inside housing 10. Camera mounting bracket 160 may be configured to accept mounting mechanisms from fixed cameras and pan/tilt/zoom camera. The cameras may be secured to bracket 160, and then to the mounting platform 120, 130, which in turn may be secured inside housing 10. This construction allows for all the cameras to first be mounted to camera mounting bracket 160 while outside of housing 10. The complete assembly platform can then be inserted and secured in housing 10.

In any of the embodiments taught and described herein, the camera mounting bracket may be a single (i.e., unitary) or multi-component device so long as the bracket comprises one portion adjustably affixed to a camera, and a portion that can extend or be received through the slots in the mounting platform and be reversibly loosened and secured to the surface(s) of the mounting platform in order to slide and affix, respectively, the bracket. In certain embodiments, the camera mounting brackets are slidably and/or adjustably affixed to the mounting platform near the top of the internal chamber of the housing, near the bottom of the internal chamber of the housing or a combination of both. In certain embodiments, the camera mounting brackets are slidably and/or adjustably affixed to the mounting platform near the top of the viewing window, near the bottom of the viewing window or a combination of both.

In certain embodiments, the camera mounting bracket comprises a fastener having a body defining a head and a shaft, wherein the head is wider than the shaft and also wider than the width of the slot or combination of slots (see, e.g., 122, 132, FIGS. 12 and 13) in the mounting platform. In other words, the slots in the mounting platform have a width sufficient to retain the head of the fastener while allowing the shaft of the fastener to extend therethrough and engage the camera mounting bracket 160. In certain embodiments, the head of the fastener rests or sits directly or indirectly on a surface of the mounting platform 120, 130.

In additional embodiments, the camera mounting bracket 160 comprises a shaft having a portion of which extends through the slot in the mounting platform, and is received by a nut, a bolt or other fastener, configured to slidably and/or adjustably affix the camera in a position along the slot in the mounting platform 120, 130, wherein the fastener is configured to be reversibly loosened and tightened, and wherein when loosened, the camera mounting bracket 160 can be slid along the length of the slot 122, 132 in the mounting platform 120, 130, and when tightened the camera 162 is secured into position.

In a preferred embodiment, the camera mounting bracket 160 comprises a post and an approximately flat washer or nut portion configured to rest on a surface of the mounting platform 120, 130, a reversibly securable fastener that extends through the slot in the mounting platform 120, 130, which is received by the flat washer or nut portion, wherein the other end of the post comprises a camera mount. In a preferred embodiment, the camera mount comprises a ball-and-socket mount for adjustably affixing a camera. For example, a post-type camera mounting bracket that can be utilized in the described devices includes, e.g., the VideoSecu swivel video camera mount bracket having a mini-ball head camera mount that can turn, rotate, and tilt; which also provides customizable length.

Figure 14:
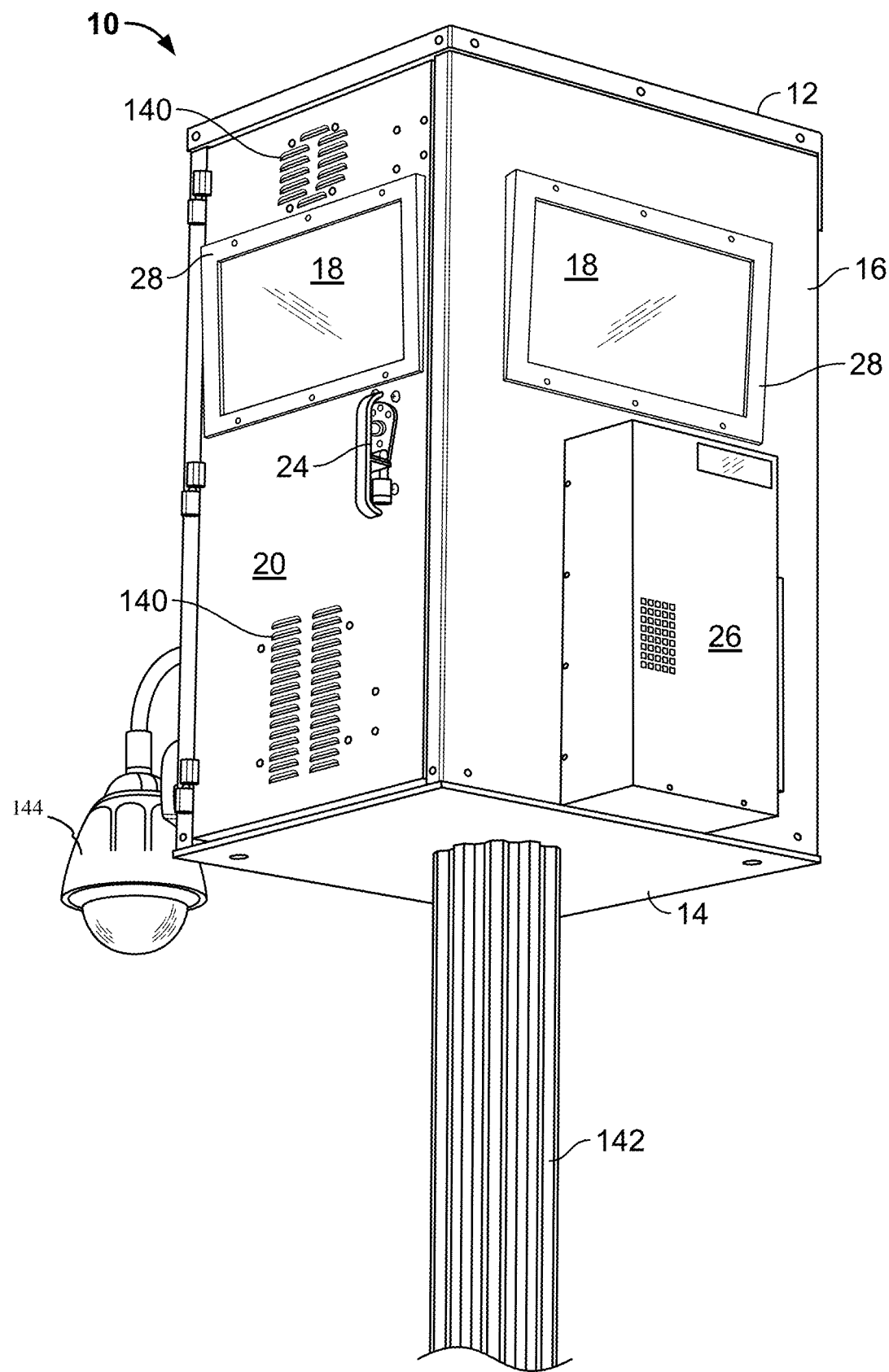
FIG. 14 illustrates a an exemplary video surveillance device as described herein bottom-mounted to the top of a post.

FIG. 14 illustrates the exemplary housing 10 depicted in FIG. 1 bottom-mounted to a post 142. FIG. 14 shows the top 12 surface and bottom 14 surface, side walls 16, door 20 hingely connected to a side wall, latch 24, viewing window 18 and viewing window assembly 28. In addition, the device in FIG. 14 also comprises a plurality of vents 140 in the housing 10 to facilitate temperature control within the housing 10. In addition, FIG. 14 illustrates another embodiment of the device, comprising an external surveillance camera, e.g., a pan/tilt/zoom camera 144. In additional aspects, the device comprises one or more external components, e.g., microphone, camera, loud speaker, light, projector, or the like.

Because the device is configured to provide 360 degree imaging, it is preferred that the device be mounted in such a way that allows for unencumbered imaging. Thus, in a preferred embodiment, the device as described herein is mounted by securing the device to a platform via the bottom or top of the device. However, the description is not so limited. In view of the present description the skilled artisan could ascertain other possible mounting configurations that would provide approximately 360 degree surveillance, all of which are expressly contemplated and incorporated herein.

Figure 15:
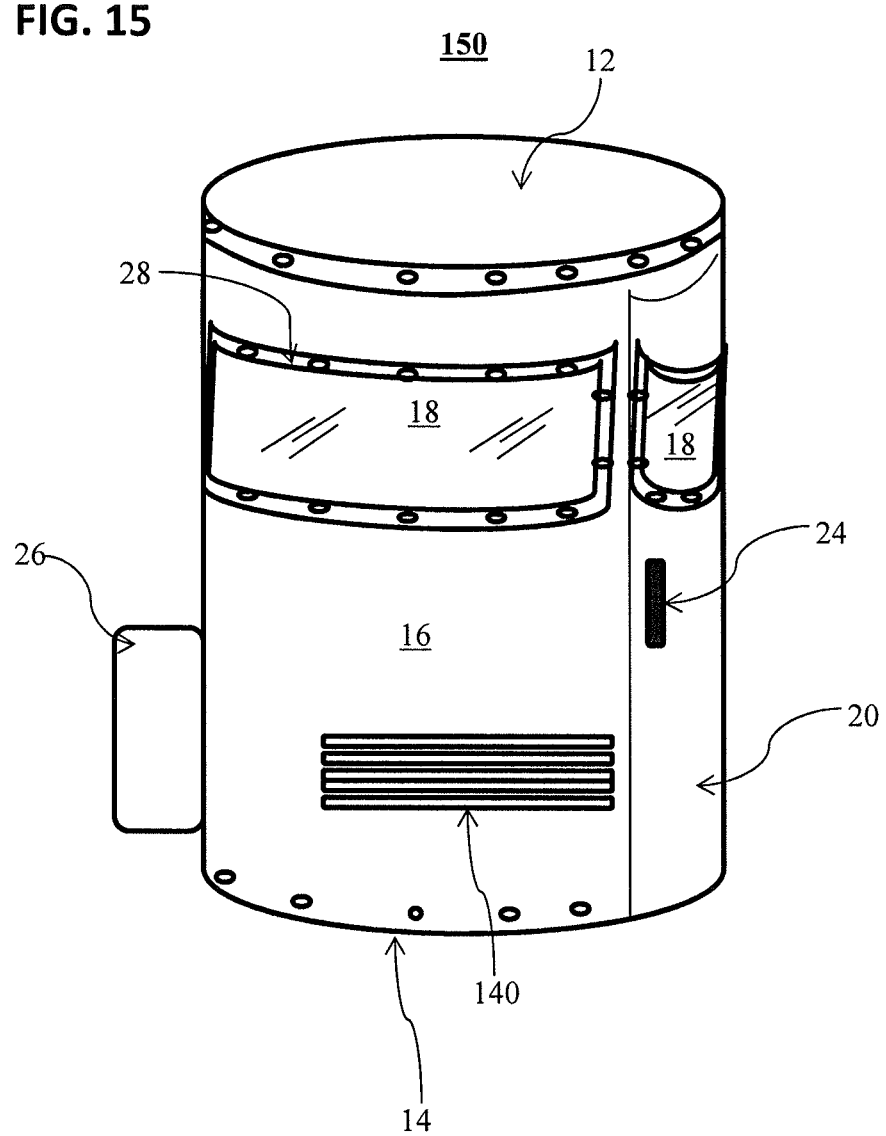
FIG. 15 illustrates a perspective view of another exemplary video surveillance device housing as described herein having a cylindrical shape.

FIG. 15 demonstrates another exemplary embodiment of the housing 10. The housing 10 in FIG. 15 is cylindrical and comprises a top surface 12, a bottom surface 14, and a side wall 16 including a viewing window or opening 18. For example, in the exemplary embodiment of FIG. 15, the viewing window 18 comprises a viewing window assembly 28, which extend around the circumference of the housing 10. FIG. 15 also illustrates a door 20 hingely connected to the side wall, and a plurality of vents 140. In addition, the exemplary device of FIG. 15 further includes a door latch or lock 24.

The described device is built to offer full 360 degree coverage simultaneously with simultaneous wide angle and zoomed views, vertically and horizontally from the units mounted position. In addition, it provides a system in which multiple views can be attained from any configuration of angles or zoom requirements. The described device also provides the capacity to house many devices for many purposes to achieve the most complete 360 degree coverage from its position.

Thus, in another aspect, the housing further comprises a camera adjustably affixed to each bracket camera mount, wherein the cameras are configured to provide for substantially 360 degree viewing or imaging simultaneously. Thus, in certain embodiments, the housing comprises a plurality of adjustably fixed cameras fixed to each camera mount. In certain embodiments, the housing also comprises a Pan/Tilt/Zoom (PTZ) camera device. Such cameras can also be used for live viewing and/or recording imaging data. In any of the embodiments taught and described herein, the device comprises a plurality of cameras, for example, an analog camera, a digital camera, an infrared camera, a heat imaging camera, a video camera, a still image camera, or a combination thereof. Suitable cameras for use in the devices as described herein include and not limited to IP devices made by Hitachi, Axis, Bosch, Panasonic, Pelco, and/or Digital Analog devices made by Bosch, Panasonic, Pelco, DSP and/or PTZ devices made by Panasonic, Bosch, Pelco, Axis, etc. In an additional embodiment, the device comprises a motion activated camera. In a preferred embodiment, the cameras are configured within the housing such that substantially 360 degrees of viewing or imaging data is captured (and recorded and/or transmitted) simultaneously.

In certain embodiments, the device includes controls and communications circuitry operably connected to the adjustably fixed cameras and/or the pan/tilt/zoom cameras, where the circuitry is configured to detect the occurrence of a triggering event from a first signal received from at least one of the adjustably fixed cameras and where the circuitry is configured to act upon the triggering event by at least causing the at least one pan/tilt/zoom camera to zoom-in in the direction of the triggering event. Triggering events may include events based on logic, business systems such as point of sale events, or chain of events; or analytics including movement in a zone of interest, a person or vehicle crossing a predetermined line, a person or vehicle crossing a perimeter, a number of persons or vehicles have gone by an area, a person or vehicle is being followed through a secured entry point, persons loitering, persons grouping, crowd gathering, person slipping and falling, a person spending excessive time in an area, movement of a vessel on water surface, objects left behind for a specified amount of time, a vehicle parked for a specified amount of time, an object or vehicle obstructing a road way or tracks, an object removed from an area, and so on. The images, sound, or video may be archived in a data store such as a database, together with identifying information such as the name or identification of the triggering event or input device, time and date, camera name, camera position, and so on. The images, sound, or video may be archived in a data store such as a database, together with identifying information such as the name or identification of the triggering event or input device, time and date, camera name, camera position, and so on. Archiving archives the images or video in relation to the identifying information in such a way that would permit later retrieval of the images or video by use of a query for the identifying information. At a later time, a user may retrieve video or images by querying the database.

In certain additional embodiments, the housing also comprises one or more light-impenetrable or opaque vertical partitions, curtains or shrouds separating one side from the another thereby reducing or preventing the glare or light entering from one side of the housing from interfering with cameras on the other side of the partition within the housing.

In certain other embodiments, the slots in the mounting platform are in an "I-I-I" configuration, as shown in FIGS. 12 and 13

In certain embodiments, the side walls may include vent openings (see 140, FIGS. 14 and 15) that allow air to flow in and out of housing 10 to cool down electronics enclosed by housing 10.

In an additional embodiment, the housing comprises a cooling unit (see, e.g., FIGS. 1, 3, 4, 6, 14, 15) e.g., a thermostat controlled air conditioning unit, for maintaining a temperature within the internal chamber of the housing. The above-referenced figures illustrate an exemplary embodiment of the cooling unit 26 attached to the device housing 10.

In any of the embodiments taught and described herein, the device comprises a computer component, e.g., at least one computer processor or server operably connected to each of the cameras, directly or indirectly. In a preferred embodiment, the processor or server is configured to capture and/or store imaging data from the cameras. In any of the embodiments taught and described herein, the device further comprises a local area network (LAN) connection, a wireless local area network (WLAN) or wi-fi internet transmitter or combination thereof.

In any of the embodiments taught and described herein, the device comprises a power source. In certain embodiments, the power source is configured to receive an AC electrical connection, a DC electrical connection, e.g., a battery or battery pack, and/or solar electric. In an embodiment, the device comprises one or more solar electric panels affixed to one or more surfaces of the device for providing power and/or charging a battery.

In any of the embodiments, described herein, the device can further comprise a quick disconnect panel for both video and power connections to the cameras, a video storage device, e.g., PC based or embedded; a power panel for cameras and other devices; a mounting shelf for the storage device; a battery backup/surge protector for all components; wireless radio; wireless antennas; a data patch panel for communication applications; an external data storage device; one or more mounted pan/tilt/zoom cameras; a climate control unit or a combination thereof.

In an additional aspect, the description provides an integrated 360 degree surveillance system comprising the device as described above, further including a computer processor or server operably connected to the cameras. In certain embodiments, the system comprises the device as described herein, further comprising: a CPU box including controls and communications circuitry; a power supply operably connected to the controls and communications circuitry to power the controls and communications circuitry and an adjustably fixed camera, and the at least one pan/tilt/zoom camera; and input/output interfaces operably connected to the controls and communications circuitry, where the CPU box, the power supply, and the input/output interfaces are disposed within the housing. In certain additional embodiments, the device includes multiple CPU boxes for integration of other communication components including, e.g., a call box with voice over IP, etc.

Figure 16:
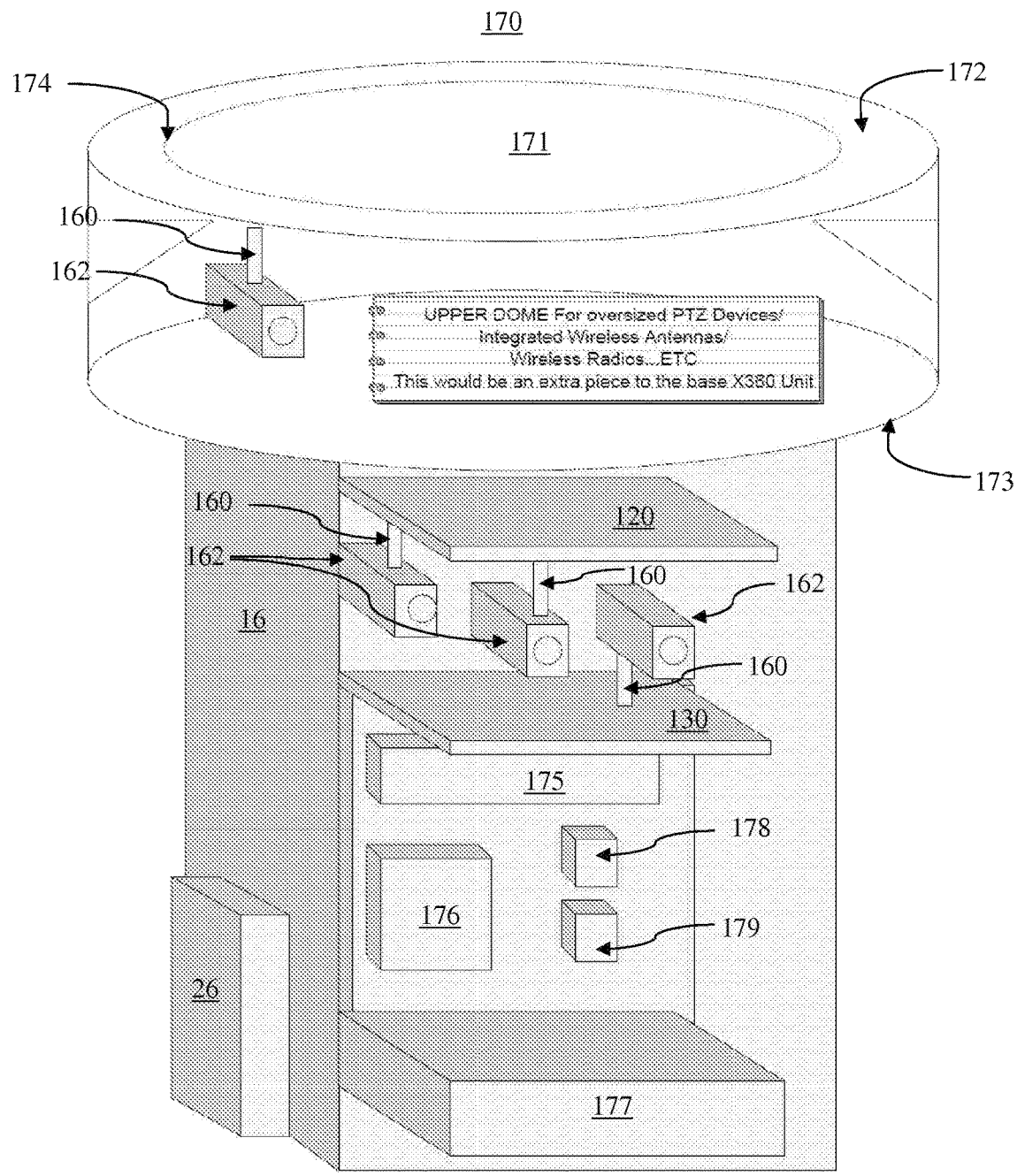
FIG. 16 illustrates another exemplary embodiment of a video surveillance device and system as described herein. In particular, the Figure demonstrates a two-part housing in which a second housing (in this example a cylindrical housing) is affixed or secured to a surface of the first housing. In a preferred embodiment, the second housing comprises one or more pan/tilt/zoom cameras configured move or rotate 360 degrees.

In another aspect, the description also provides a device as described above further including a second housing appended to the first. In one embodiment, the second housing can be as described herein. FIG. 16 illustrates an exemplary embodiment of the two-part device 170 comprising a second housing 171 defining a top surface 172 and a bottom surface 173, a mounting platform 174, a camera mounting bracket 160, and a camera 162. In certain embodiments, the second housing comprises a pan/tilt/zoom camera. FIG. 16 also illustrates a device having a patch panel 175, power panel 176, digital video recorder 177. 178 and 179 are data and power interconnectors for electronic equipment, i.e. video, audio, fiber, data, etc. The second housing 171, like the housing 10 of FIG. 1, can be of any desired size and shape.

Figure 17:
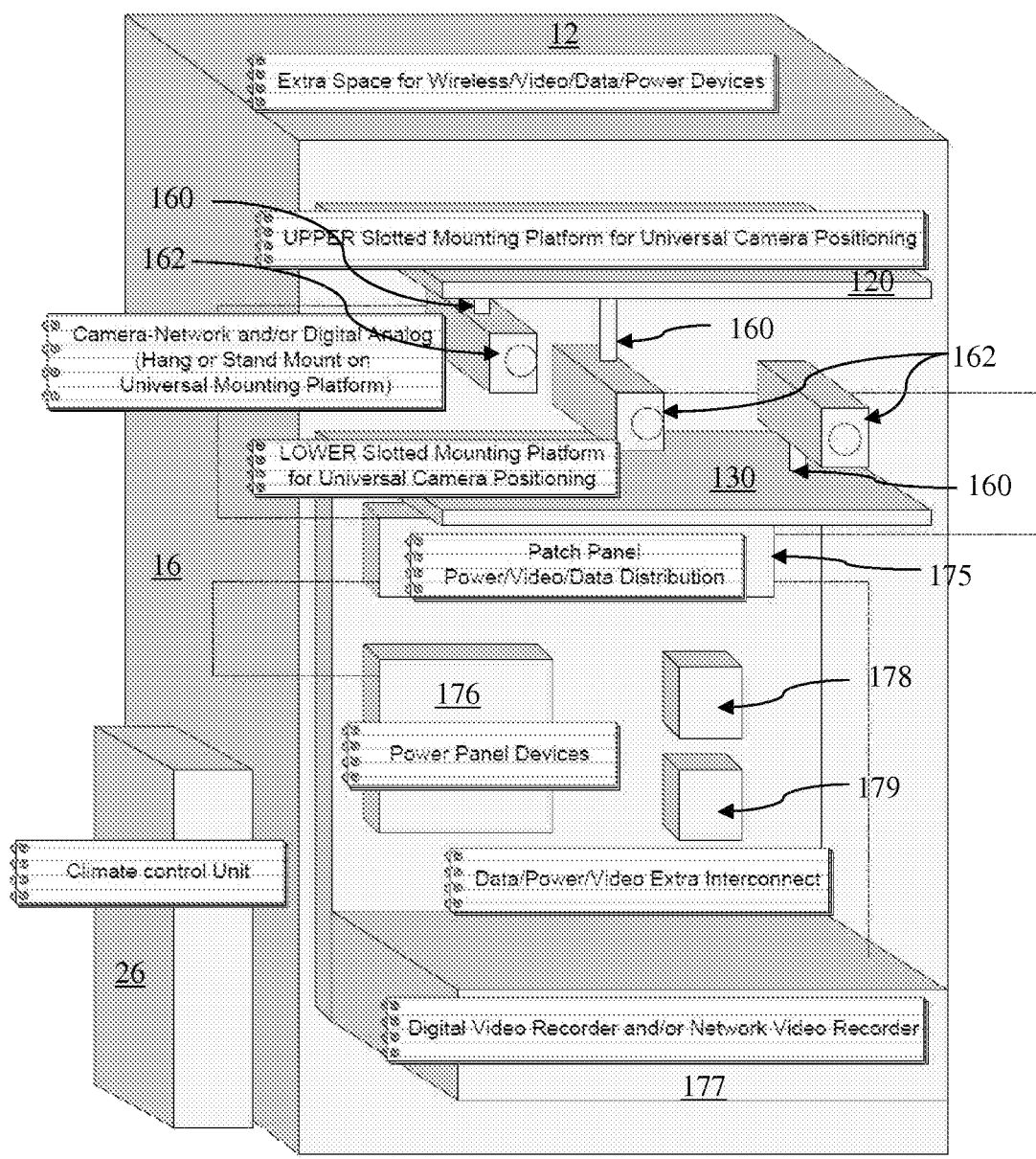
FIG. 17 illustrates a schematic of the an exemplary video surveillance device or system as described herein, including the housing, mounting platforms, cameras, camera mounting brackets, data/power patch panel, power panel, climate control unit, digital video recorder/network video recorder.
Figure 18:
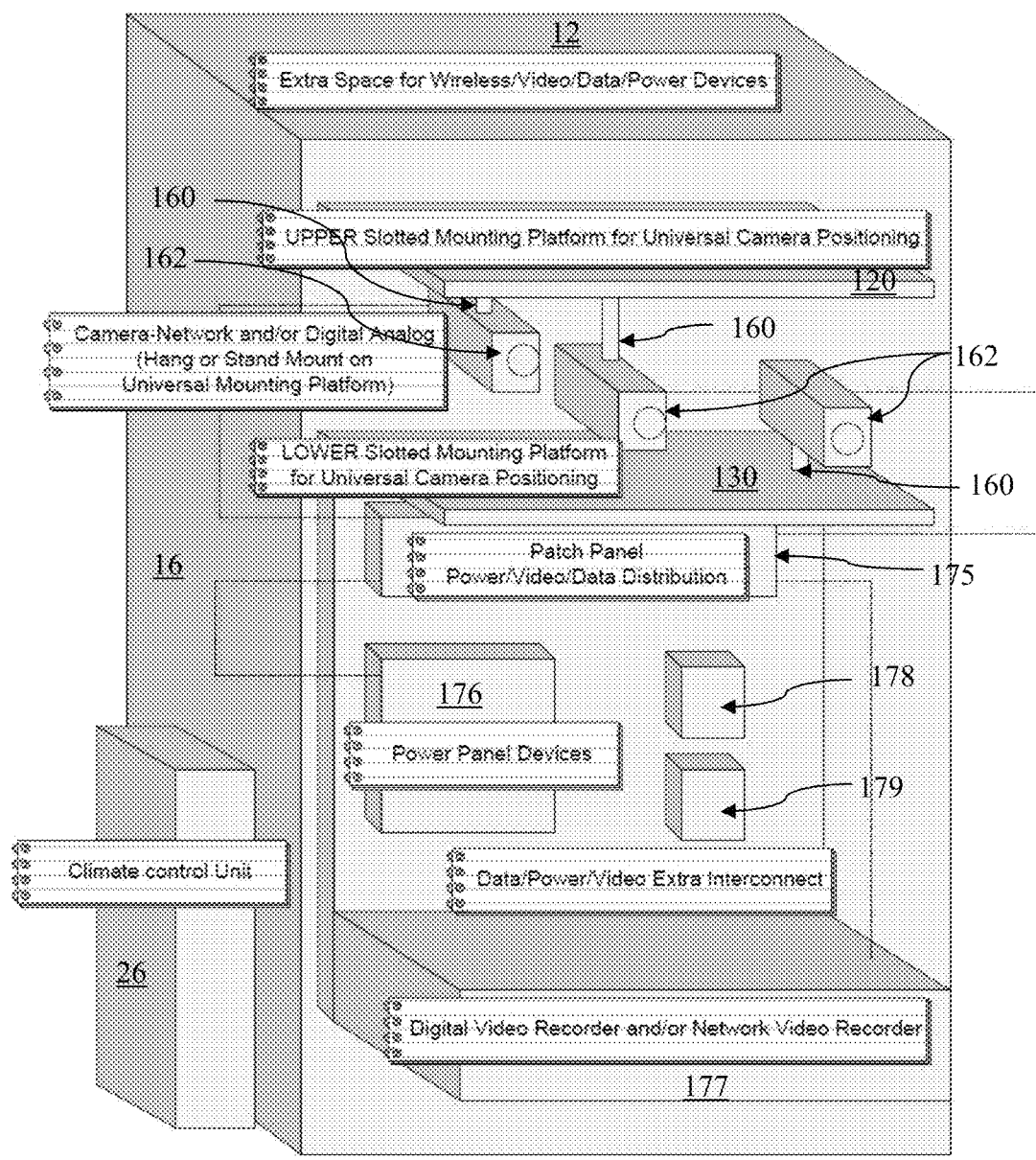

In another aspect, the description provides a surveillance device or system that provides 360 degrees of viewing, data storage and remote viewing. FIG. 17 illustrates an exemplary embodiment of the device or system 180 comprising the surveillance system provided by the present description. The exemplary device or system 180 comprises a housing 10 that defines an internal chamber and includes viewing windows (not shown) in the side walls, wherein the viewing windows are configured to allow approximately 360 degrees of camera viewing or imaging. In a preferred embodiment, the viewing windows are configured to allow 360 degrees of camera viewing or imaging. The housing 10 further comprises an upper mounting platform 120 and/or a lower mounting platform 130. In the embodiment shown, the housing 10 comprises both an upper mounting platform and a lower mounting platform 130. In a preferred embodiment, the housing 10 further includes a vertical partition or shroud (not shown) between the cameras to reduce glare within the housing.

The device or system 180 also comprises a system for surveillance of approximately 360 degrees of area including cameras 162 mounted to the mounting platforms 120, 130 by the camera mounting brackets 160 within the housing 10. The combination of the mounting platforms 120, 130 and the camera mounting brackets 160 provide a nearly unlimited combination of camera array configurations and camera angles and depths, achieving maximum combinations of coverage to the 360 degrees of target area. As described above, the cameras 162 can be of any desired type and include analog, digital, megapixel, TCP/IP as well as adjustably fixed cameras and pan/tilt/zoom cameras.

In certain embodiments, the device or system 180 includes a wireless radio (Point to Point, Point to Multi Point, Wifi, WiMax, Wireless Mesh, cellular, Bluetooth, etc.). In certain additional embodiments, the system includes a remote receiver, processor and display that are in electronic communication, e.g., wireless electronic communication, with the device 180, wherein the cameras 162 capture video or images simultaneously from substantially 360 degrees of view, and wherein the processor or server stores the video or image data, and wherein the internet transmitter transmits the video or image data information to a remote processor and/or display.

In certain embodiments, the device or system 180 further comprises a climate control unit 26. The climate control unit 26 is included to maintain year-round optimum operating temperature range (i.e., cooling and/or heating) for the electronic components.

In any of the embodiments of the device or system described herein, the device or system further comprises at least one of a microphone, a loud speaker, a projector or a combination thereof. For example, the microphone, can be used to capture and record audio surveillance of the area being surveyed or monitored. The audio data can be monitored in real time (i.e., live) or saved and archived, and reviewed later. The microphone can also be used to detect audible trigger events that are used to activate camera monitoring of a specific area. The loud speaker is useful for delivering or communicating audible warning signals or messages or conveying audible information to individuals in the area.

In certain embodiments, the device or system further comprises a projector. As such, in addition to 360 degree surveillance the device or system can be configured to include one or more projectors, e.g., video or still image projectors. The projectors can be used to display, e.g., on a surface such as a building, screen or billboard, any desired image or video. For example, the projector could be configured to display the surveillance footage captured by the cameras in the device. The projectors could also be configured to display informational material, e.g., warnings, security information, advertising, or any combination thereof.

In a preferred embodiment, the cameras 162 of the device or system 180 are operably connected, e.g., by wire or IP communication, to a data/power patch panel for quick connection/disconnection into the device. For example, as illustrated in FIG. 17, the power patch panel 182 is to provide power to the cameras 162. The data/power patch panel 182 also provides operable connection of the cameras 162 to the digital video recorder/network video recorder 186, and the power panel 184. 178 and 179 are data and power interconnectors for electronic equipment, i.e. video, audio, fiber, data, etc. The digital video recorder and/or network video recorder is installed to record video from cameras (e.g., analog, digital, heat imaging camera, infrared, megapixel and/or IP based).

The data/power patch panel 182 also provides connection to the data card of the DVR, IP based cameras to the switch 190, NVR to the switch 190, wifi/fiber/Cat5 remote communication of the unit to the switch 190, and remote maintenance devices to the switch 190. The battery backup/surge protector 188 provides pass through power and surge protection to the storage device (DVR and/or NVR) 186, digital and/or megapixel cameras 162, wifi radio with wifi antenna 188, data switch 190 and climate control unit 26. In certain embodiments, the device or system 180 further comprises a DVR/NVR mounting platform to mount the server in the device. In still additional embodiments, the system comprises a pan/tilt/zoom camera for "live" review of coverage area.

As described above, it is contemplated that the housing, viewing windows, and mounting platform(s), and any other part of the device can be of any desired size or shape. In addition the housing, viewing windows, and mounting platform(s), and any other part of the device can be manufactured out of steel, aluminum, plastic, or polycarbonite provided that the windows are large enough to allow for substantially 360 degrees of viewing by the camera array contained within the housing.

In certain embodiments, the device or system includes a housing of any dimension as described in FIG. 1. In a preferred embodiment, inside of the enclosure will be mounted a mounting platform to include mounting devices, e.g., camera mounting brackets, in a hanging position and/or a mounting platform to include mounting devices, e.g., camera mounting brackets, in a post position. In an additional embodiment, the housing comprises a backboard configured to receive at least one of a patch panel data/video/power panel, a power panel, additional spaces to include data, power or video connections, or combinations thereof. In a preferred embodiment, the camera mounting bracket is a universal mounting post, which includes a fastener which is slidably or adjustably affixed to the mounting platform(s), and a portion configured to adjustably affix a camera. The purpose of mounting a camera to the platform in a universal configuration is to optimize coverage. In certain additional embodiments, a mounting shelf is affixed within the housing to shelve a digital video recorder and/or network video recorder, or other electronics (switches, modems, routers, wireless equipment, etc.). In certain additional embodiments, the device includes cable management components for guiding the infrastructure cable within the housing.

In any of the embodiments described herein cable or wires are used to operably connect the electronic components. For example, in certain embodiments, video cables are employed to interconnect the DVR/NVR and the cameras, e.g., directly (bypassing the patch panel) and/or indirectly (passing through the patch panel for quick connect/disconnect function). In addition, data cables can be employed to interconnect any of the electronic components. For example, data cables can be used to connect the DVR/NVR to electronic switch(es), routers, wireless bridge, wireless radio, cameras or the like.

In additional embodiments, the device or system comprises power cables to make electric connection from the power panel and/or transformer to the electric components directly (bypassing the patch panel) and/or indirectly (passing the current through the patch panel for quick disconnect.

In certain embodiments, the system is entirely housed in and operably connected within the housing. In other embodiments, certain components can be affixed or secured externally to or on the housing but operably connected within the housing. Once all components are installed the equipment is then connected together with cabling: Video Patch Cords, Low Voltage Power Patch Cords, Data Patch Cords. The components that can be operably connected in any of the embodiments described herein include, e.g., a battery backup/surge protector, a DVR/NVR, a camera power panel, a wireless radio, network equipment, cameras, data/power patch panel, and other accessories to the system.

As described above, cameras for use in any of the can be analog or digital or IP based or megapixel. Depending on the focal requirements of each installation, device or system could have any combination of the cameras included. The more cameras the more flexibility and coverage. In certain embodiments, video recording is needed for the interface between the analog/digital cameras and the user. The video recording device can be in the form of a DVR (Digital Video Recorder) and/or NVR (Network Video Recorder) for network based cameras IP and/or mega pixel. The device is scalable to multi-terabyte in size which can give each unit sufficient recording space for most any application. In certain additional embodiments, networking connectivity is utilized for the interface between the user and the device or system. The network interface can come equipped as wireless, fiber optic and/or ethernet, depending on network architecture needs. In additional embodiments, the device or system includes a battery backup and/or surge protector.

Power is always needed and solar power to the unit will eliminate the need for wired power. Solar will give the ability to install the unit anywhere without being limited by facilities. Thus, in certain embodiments, the device or system comprises solar panels operably connected to one or more rechargeable batteries for powering the device or system. Multiple Camera types and Video Recorders offer a multitude of configurations in one single device or system.

The device or system 180 may also incorporate retrieval logic. A user may retrieve images or video archived by using retrieval logic. Retrieval logic may work in conjunction with I/O devices or interfaces for the user to query the data store containing the still images or video. Archiving logic archives the images or video and the identifying information in such a way that permits later retrieval of the images or video by use of a query for the identifying information. Thus, the user may effectively and efficiently query the data store with the identifying information to retrieve the images or video. For example, a user may use retrieval logic to query the database for a specific time and date, and retrieval logic would return images or video corresponding to the time or date queried. A user may also query the database with the name of the input device that triggered archiving of the video segment or images.

Moreover, if the device or system 180 used as an input device, for example, analytics logic in combination with cameras, a user may use retrieval logic to query the database for identifying information regarding, for example, behavior of a subject captured on video by the cameras. For example, if the analytics were programmed to detect a subject loitering in a parking lot, once the analytics detect the behavior, loitering, through analysis of the video captured by camera, the analytics logic would transmit a signal to detection logic, which in turn would cause archiving logic to begin archiving the captured video. Archiving logic archives the captured video with identifying information that would identify the archived video as a loitering incident. Thus, a user may later retrieve the video by use of retrieval logic. The user would query the database for, for example, the term "loitering" and the date, which would return all loitering incidents on that date. Additional software programs for multiple or single purposes can be added to the system upon architectural needs arise, examples include but are not limited to, facial recognition, license plate identification, behavioral patterns, etc. In addition the system can work in concert with other data bases available to enhance system abilities.

Retrieval logic may be configured with a set of search filters so that a user may select filters to find a video segment or image of interest to the user based on the selected filters. Retrieval logic may also present to the user a still image or thumbnail of each archived video segment so that the user may efficiently sift through archived segments for the one of interest to the user.

The device or system 180 may communicate with various other devices and logics using other busses that are not illustrated (e.g., PCIE, SATA, Infiniband, 1394, USB, Ethernet). The bus can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The device or system 180 may interact with additional input/output devices via I/O interfaces and I/O ports. Input/output devices can include, but are not limited to, a keyboard, a microphone, a pointing and selection device, video cards, displays, disks, and so on. The I/O ports can include but are not limited to, serial ports, parallel ports, and USB ports. In one embodiment, I/O ports may communicate with input devices via I/O interfaces using known communication protocols such as Controller Area Network (CAN), Modbus, ZigBee, Ethernet Global Data (EGD), SERCOS, and so on.

The device or system 180 can operate in a network environment and thus may be connected to network devices via I/O interfaces, or the I/O ports. Through the network, system may be logically connected to remote computers. The networks with which system 180 may interact include, but are not limited to, a local area network (LAN), a wide area network (WAN), and other networks such as the Internet. Network devices can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and so on. Similarly, network devices may have cellular connectivity or may connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications. For example, a user seeking to adjust cameras may make use of a 2.4 GHz communication signal to see via a handheld device the view of any one of cameras. The user may then adjust one or more of the cameras to a desired position based on the user observing in the handheld device the current view being received by the camera.

When device or system 180 is connected to remote computers via the network, a user at a remote computer may access still images or video captured by cameras and/or live images or the user may access the archived images or video remotely via retrieval logic which may be accessible via a user interface such as a web browser at the remote computer. Further, connection to a network may provide system with an internet connection where a user may view camera views real time and archived images or video from anywhere using a web browser. Thus, a user may be able to monitor the surveillance area at a safe distance from the system. A user may also use input devices such as a joystick to control the camera pan, tilt, and zoom. Moreover, when system is connected to a network, system may be made to send, for example, email or text message to alert a remote user of a detected condition. System may also be accessed remotely to, for example, determine the health of the system, diagnose system failure, and so on. Such remote access may be conditioned on the remote user being authenticated by the use of a password. System while connected to a network may also automatically receive software updates from authenticated sources.

In still an additional aspect, the description provides a method of surveying or monitoring simultaneously and in real-time a substantially 360 degree area comprising the steps of providing a surveillance device or system as described herein and a remote display, wherein the device and the remote display are in computer communication, supplying power to the same, and monitoring remotely substantially 360 degrees of viewing area simultaneously.

The device and system as described herein provides an all-in-one solution that offers flexibility and complete live and recorded video coverage of any area that the unit is installed. The device can be configured to offer full 360 degree coverage with simultaneous wide angle and zoomed views, vertically and horizontally from the device's mounted position. In addition, it provides a system in which multiple views can be attained from any configuration of angles or zoom requirements. Provides many devices for many purposes to achieve the most complete 360 degree coverage from its position. In addition, the Pan/Tilt/Zoom device can be added for live viewing, and recording can be completed in multiple terabytes locally. In additional situations a device may be added externally for purposes of covering a requested area not in the view of the mounted position.

The device or system as described herein can be installed in any number of situations, including for example, the center of a campus environment to achieve angles away from the building verses on the building. One device or system will cover the same area as many individual camera housings and devices, which are labor intensive to install. Other areas that are well suited for use with the described device or system include the center of a community park, mall parking lot, city square, road intersect ion, airport airfield, etc. In is also contemplated that the device or system as described herein can be installed indoor, e.g., banks, lobbies, etc. for monitoring of interior areas. Additional applications of the device include as a means of displaying information by printing, projecting or otherwise displaying material directly on the outer surface of the device. In certain embodiment, the information displayed on the surface of the device is advertising material.

It is also contemplated that the device and system as described herein can be integrated with other electronic utilities currently in use, e.g., automatic teller machines, informational kiosks, or the like, where the use of the utility acts as a trigger event to initiate surveillance of a desired place or location.

The contents of all references, patents, pending patent applications and published patents, cited throughout this application are hereby expressly incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

The invention claimed is:

1. A device for surveillance imaging comprising:
a housing defining an internal chamber and including a viewing window on each side wall, wherein the internal chamber of the housing comprises,
   (a) a mounting platform having a top surface and a bottom surface and a plurality of slots extending therethrough, each slot having a two-dimensional configuration;
   (b) a plurality of camera mounting brackets comprising one end having a camera mount configured to adjustably affix a camera, and another end that is adjustably affixed to the mounting platform through the plurality of two-dimensional slots for the camera mounting brackets to slide and adjustably affix within the two-dimensional configuration of the slots along an axis of the mounting platform; and
   (c) a camera adjustably affixed to each camera mounting bracket,
wherein each of the plurality of the camera mounting brackets includes one of the following:
(i) the end of the camera mounting bracket that is adjustably affixed to the mounting platform rests on the top surface of the mounting platform and reversibly receives a fastener that has a head that is wider than the slot and a shaft that extends from the head through the slot to the end of the camera mounting bracket resting on the mounting platform to slidably and adjustably affix the camera mounting bracket to the mounting platform; or
(ii) the end of the camera mounting bracket that is adjustably affixed to the mounting platform has a portion wider than the slots that rests on the top surface of the mounting platform and includes a co-axial shaft that extends through the slot of the mounting platform to a fastener that is larger than the slot and is reversibly secured to the co-axial shaft to slidably and adjustably affix the camera mounting bracket to the mounting platform.

2. The device of claim 1, further comprising at least one of a computer processor or server, a microphone, a loud speaker, a projector, a local area network (LAN) connection, a wireless local area network (WLAN) connection, a wi-fi internet transmitter, a digital video recorder, a power panel, a patch panel, a climate control unit or a combination thereof.

3. The device of claim 2, wherein the processor or server is configured to capture and/or store imaging data from the cameras.

4. The device of claim 1, wherein the housing further includes a rail configured to form a slot, configuration of slots or track; a plurality of rails configured to form a slot, configuration of slots or track; or a combination of thereof.

5. The device of claim 1, wherein the mounting platform is affixed within the housing in a substantially horizontal plane near the top of the viewing window.

6. The device of claim 1, wherein the housing comprises two mounting platforms, each affixed within the housing in a substantially horizontal plane, wherein the mounting platforms define three compartments within the internal chamber of the housing.

7. The device of claim 1, comprising at least one of an analog camera, a digital camera or a combination thereof.

8. The device of claim 7, wherein the viewing window in the side walls is of a sufficient size to allow viewing of approximately 360 degrees.

9. The device of claim 1, wherein the housing has at least three side walls, each comprising a viewing window.

10. The device of claim 1, wherein the housing is cylindrical, and wherein the side wall comprises a viewing window sufficient to provide for 360 degree imaging.

11. The device of claim 1, wherein the slots in the mounting platform are in an "I-I" or "I-I-I" configuration.

12. The device of claim 1, wherein the fastener is configured to be reversibly loosened and tightened, wherein when loosened the camera mounting bracket can be slid along the length of the slot in the mounting platform, and when tightened the camera is secured into position.

13. The device of claim 1, wherein the mounting platform is affixed in the internal chamber of the housing near the top of the viewing window.

14. The device of claim 13, wherein a second mounting platform is affixed near the bottom of the viewing window within the housing.

15. The device of claim 13, wherein the camera mounting brackets have a plurality of lengths.

16. The device of claim 1, wherein the mounting platform is secured within the housing at a height sufficient to align the viewing windows with the viewing angle of the cameras.

17. The device of claim 1, further comprising a door hingely connected a side wall.

18. An integrated 360 degree surveillance system comprising the device of claim 1, a computer processor or server, a wireless internet transmitter, and a remote display, wherein the cameras capture video or images simultaneously from substantially 360 degrees of viewing, the processor or server comprises a program or application configured to control camera function and store video or image data, and wherein the internet transmitter transmits the video or image data information to a remote display.

19. The device of claim 1, wherein the camera mount is configured for the camera to be two-dimensionally adjusted relative to the mounting bracket.

20. The device of claim 1, wherein the camera mount is a mini-ball head camera mount.

* * * * *